(12) United States Patent
Futaki

(10) Patent No.: US 10,342,016 B2
(45) Date of Patent: Jul. 2, 2019

(54) RADIO STATION, RADIO TERMINAL APPARATUS, AND METHOD FOR THESE

(71) Applicant: NEC CORPORATION, Tokyo (JP)

(72) Inventor: Hisashi Futaki, Tokyo (JP)

(73) Assignee: NEC CORPORATION, Minato-Ku, Tokyo (JP)

( * ) Notice: Subject to any disclaimer, the term of this patent is extended or adjusted under 35 U.S.C. 154(b) by 10 days.

(21) Appl. No.: 15/552,642

(22) PCT Filed: Dec. 24, 2015

(86) PCT No.: PCT/JP2015/006441
§ 371 (c)(1),
(2) Date: Aug. 22, 2017

(87) PCT Pub. No.: WO2016/142979
PCT Pub. Date: Sep. 15, 2016

(65) Prior Publication Data
US 2018/0035430 A1 Feb. 1, 2018

(30) Foreign Application Priority Data

Mar. 6, 2015 (JP) ................ 2015-045124

(51) Int. Cl.
*H04W 72/04* (2009.01)
*H04W 72/12* (2009.01)
*H04L 1/00* (2006.01)

(52) U.S. Cl.
CPC ....... *H04W 72/0453* (2013.01); *H04L 1/0041* (2013.01); *H04W 72/04* (2013.01); *H04W 72/0446* (2013.01); *H04W 72/12* (2013.01)

(58) Field of Classification Search
CPC ............. H04W 72/0453; H04W 72/04; H04W 72/0446; H04W 72/12; H04L 1/0041
See application file for complete search history.

(56) References Cited

U.S. PATENT DOCUMENTS 9,184,880 B2 * 11/2015 Vos ................ H04L 1/1819
2007/0047485 A1 3/2007 Gorokhov et al.
(Continued)

FOREIGN PATENT DOCUMENTS

EP 2 816 858 A1 12/2014
EP 3 195 508 A1 7/2017
(Continued)

OTHER PUBLICATIONS

"3rd Generation Partnership Project; Technical Specification Group Radio Access Network; Medium Access Control (MAC) protocol specification (Release 12)", Technical Specification, 3GPP TS 25.321, Dec. 2014, V12.2.0, total 214 pages.
(Continued)

*Primary Examiner* — Ian N Moore
*Assistant Examiner* — Latresa A McCallum
(74) *Attorney, Agent, or Firm* — Sughrue Mion, PLLC

(57) ABSTRACT

A radio station (3) allocates a first plurality of time-frequency resources (430) and a second plurality of time-frequency resources (530) to at least one radio terminal (1, 2). The first plurality of time-frequency resources (430) are used to transmit or receive a first transport block (460) in accordance with a first transmission time interval (TTI). The first TTI is equal to a duration of one subframe (410, 510). The second plurality of time-frequency resources (530) are used to transmit or receive a second transport block (560) in accordance with a second TTI. The second TTI is shorter than the duration of the subframe (410, 510).

19 Claims, 23 Drawing Sheets

(56) References Cited

U.S. PATENT DOCUMENTS

2008/0049690 A1 2/2008 Kuchibhotla et al.
2015/0334729 A1* 11/2015 Ji ..................... H04W 72/0453
370/336

FOREIGN PATENT DOCUMENTS

JP 2009-506679 A 2/2009
WO 2014/040531 A1 3/2014

OTHER PUBLICATIONS

Communication dated Sep. 12, 2018 from the European Patent Office in counterpart Application No. 15884477.9.
"Study on Latency reduction techniques for LTE", Ericsson, RP-150310-Motivation for new proposed SI, http://www.3gpp.org/ftp/tsg_Ran/tsg_Ran/TSGR_67/Docs/RP-150310.zip, Mar. 3, 2015, 16 pages.
"3$^{rd}$ Generation Partnership Project; Technical Specification Group Radio Access Network; Feasibility study for evolved Universal Terrestrial Radio Access (UTRA) and Universal Terrestrial Radio Access Network (UTRAN) (Release 12)", 3GPP TR 25.912, http://www.3gpp.org/ftp/Specs/archives/25_series/25.912/25912-c00.zip, Sep. 2014, p. 16.
"New SI proposal: Study on Latency reduction techniques for LTE", Ericsson, 3GPP TSG RAN Meeting #67 RP-150309, http://www.3gpp.org/Work-Items, Mar. 9-12, 2015, pp. 1-2.
Hisilicon Huawei, "Motivation of New SI Proposal Latency Reduction", 3GPP TSG RAN Meeting #67 RP-150238, http://www.3gpp.org/ftp/tsg_Ran/tsg_Ran/TSGR_67/Docs/RP-150238.zip, Mar. 9-12, 2015, 12 pages.
Eeva Lähetkangas, et al., "On the TDD Subframe Structure for Beyond 4G Radio Access Network", Future Network and Mobile Summit, Jul. 2013, 11 pages.
International Search Report for PCT/JP2015/006441 dated Mar. 15, 2016 [PCT/ISA/210].
Written Opinion for PCT/JP2015/006441 dated Mar. 15, 2016 [PCT/ISA/237].

* cited by examiner

US 10,342,016 B2

RADIO STATION, RADIO TERMINAL APPARATUS, AND METHOD FOR THESE

CROSS REFERENCE TO RELATED APPLICATIONS

This application is a National Stage of International Application No. PCT/JP2015/006441 filed Dec. 24, 2015, claiming priority based on Japanese Patent Application No. 2015-045124 filed Mar. 6, 2015, the contents of all of which are incorporated herein by reference in their entirety.

TECHNICAL FIELD

The present disclosure relates to radio communication and, in particular, to allocation and use of a plurality of time-frequency resources.

BACKGROUND ART

As next-generation radio communication technology beyond 4G (Long Term Evolution (LTE)-Advanced), 5G has been attracting attention. Various studies on 5G including use cases and requirements for 5G have been started. Reduction in access latency (Latency Reduction) is drawing attention as a major requirement for 5G. Examples of access latency includes: a time required for radio terminal (User Equipment (UE)) to complete transmission of data to a radio base station (eNodeB (eNB)); a time required for a UE to complete transmission of data to an external network (e.g., application server); a time required for a UE to complete transmission of data to another UE; or a time required for a UE to establish preparation for transmitting data. In the present specification, a time period from when a radio terminal (UE) requests a grant for transmission of uplink (UL) data from a radio base station (eNB) until when the UE completes the transmission of the UL data to the radio base station (eNB) is used as an example of the access latency. Further, radio communication in which some kind of access latency is reduced as compared to existing radio communication (e.g., LTE and LTE-Advanced) is collectively referred to as "low latency access".

Non Patent Literature 1 discloses a Time Division Duplex (TDD) system (hereinafter referred to as B4G TDD) where both uplink (UL) and downlink (DL) exist within one subframe in order to achieve low latency access. In B4G TDD, for example, a request for UL radio resources from an UE (i.e., Scheduling Request (SR)), transmission of allocation information of the UL radio resources from an eNB (i.e., Scheduling Grant (SG)) in response to the request, and transmission of UL data in accordance with the SG are performed within one subframe. If the UL data is successfully received by the eNB in one transmission, access latency (in this case, the access latency is assumed to be a time period from when the UE transmits the SR to the eNB until when the UE completes the transmission of the UL data) is reduced from about 10 millisecond (ms), which has been required before, to a subframe length (e.g., 1 ms). Non Patent Literature 1 also discloses using a subframe length (e.g., 0.25 ms) that is shorter than the subframe length (i.e., 1 ms) of LTE and LTE-Advanced. This contributes to further reduction of the access latency.

CITATION LIST

Patent Literature

Patent Literature 1: United States Patent Application Publication No. 2008/0049690

Non Patent Literature

Non Patent Literature 1: Lahetkangas et al., "On the TDD Subframe Structure for Beyond 4G Radio Access Network", Future Network and Mobile Summit (FutureNetworkSummit), July 2013

SUMMARY OF INVENTION

Technical Problem

There is a problem in B4G TDD disclosed in Non Patent Literature 1 that it has no backward compatibility with existing LTE and LTE Advanced systems. 5G systems may be required to communicate not only with new UEs supporting low latency access but also with legacy UEs not supporting low latency access (e.g., UEs supporting only existing LTE and LTE-Advanced). As the subframe structure of B4G TDD differs from those of existing LTE and LTE-Advanced subframes, it is difficult for B4G TDD systems to communicate with the legacy UEs.

Note that the subframe is composed of a plurality of time-frequency resources and has a predetermined duration. The duration of one subframe (hereinafter referred to as "subframe duration") means a length of time over which a subframe continues or lasts. The subframe duration is commonly the same as a Transmission Time Interval (TTI) which data transmission and data reception by a UE should be performed in accordance with. The TTI is defined as a length of time (time length) over which one transport block and error detection bits added thereto are transmitted. The transport block is a data unit (i.e., MAC Protocol Data Unit (PDU)) passed from the Medium Access Control (MAC) layer to the physical layer. In the physical layer of the transmitter, the entire transport block is used to calculate error detection bits (e.g., Cyclic Redundancy Check (CRC) parity bits) and these calculated error detection bits are added to the transport block. Channel coding in the physical layer is performed on the transport block to which the error detection bits have been added. Further, in the physical layer processing in the transmitter, interleaving is performed on the coded bit sequence generated from one transport block. Accordingly, the receiver needs to receive at least one TTI data (i.e., data corresponding to the transport block and the error detection bits added thereto) in order for the receiver to be able to perform deinterleaving and decoding.

The present inventor has conducted a study about data transmission where although a new UE supporting the low latency access and a legacy UE not supporting the low latency access use the same subframe, the new UE and the legacy UE perform data transmission or reception in accordance with different TTIs. Patent Literature 1 discloses that a first plurality of time-frequency resources having a duration of 1 ms in a single 1 ms subframe are allocated to a first UE, and at the same time, a second plurality of time-frequency resources having a duration of 0.5 ms in this subframe are allocated to a second UE. Here, the duration of the first (or second) time-frequency resources means a length of time (time length) over which the first (or second)

time-frequency resources continue or last. However, in Patent Literature 1, the first and second UEs use the same TTI (1 ms).

Thus, one of objects to be attained by embodiments disclosed in the present specification is to provide an apparatus, a method, and a program that contribute to enabling a radio base station to communicate with both a radio terminal supporting low latency access and a legacy radio terminal not supporting low latency access. Note that this object is only one of the objects to be attained by the embodiments disclosed herein. The other objects or problems and novel features will be made apparent from the following description and the accompanying drawings.

Solution to Problem

In a first aspect, a radio station includes at least one radio transceiver and at least one processor. The at least one processor is configured to allocate a first plurality of time-frequency resources and a second plurality of time-frequency resources to at least one radio terminal. The first plurality of time-frequency resources are used to transmit or receive a first transport block in accordance with a first transmission time interval (TTI). The first TTI is equal to a duration of one subframe. A duration of the first plurality of time-frequency resources corresponds to the duration of the subframe. The second plurality of time-frequency resources are used to transmit or receive a second transport block in accordance with a second TTI. The second TTI is shorter than the duration of the subframe. A duration of the second plurality of time-frequency resources is shorter than the duration of the subframe.

In a second aspect, a radio terminal includes at least one radio transceiver and at least one processor. The at least one processor is configured to selectively perform a first access operation and a second access operation by using the at least one radio transceiver. The first access operation includes transmitting or receiving a first transport block in accordance with a first transmission time interval (TTI). The first TTI is equal to a duration of one subframe. The first transport block is transmitted using a first plurality of time-frequency resources in the subframe. A duration of the first plurality of time-frequency resources corresponds to the duration of the subframe. The second access operation includes transmitting or receiving a second transport block in accordance with a second TTI. The second TTI is shorter than the duration of the subframe. The second transport block is transmitted using a second plurality of time-frequency resources in the subframe. A duration of the second plurality of time-frequency resources is shorter than the duration of the subframe.

In a third aspect, a method performed by a radio station includes allocating a first plurality of time-frequency resources and a second plurality of time-frequency resources to at least one radio terminal. The first plurality of time-frequency resources are used to transmit or receive a first transport block in accordance with a first transmission time interval (TTI). The first TTI is equal to a duration of one subframe. A duration of the first plurality of time-frequency resources corresponds to the duration of the subframe. The second plurality of time-frequency resources are used to transmit or receive a second transport block in accordance with a second TTI. The second TTI is shorter than the duration of the subframe. A duration of the second plurality of time-frequency resources is shorter than the duration of the subframe.

In a fourth aspect, a method performed by a radio terminal includes selectively performing a first access operation and a second access operation. The first access operation includes transmitting or receiving a first transport block in accordance with a first transmission time interval (TTI). The first TTI is equal to a duration of one subframe. The first transport block is transmitted using a first plurality of time-frequency resources in the subframe. A duration of the first plurality of time-frequency resources corresponds to the duration of the subframe. The second access operation includes transmitting or receiving a second transport block in accordance with a second TTI. The second TTI is shorter than the duration of the subframe. The second transport block is transmitted using a second plurality of time-frequency resources in the subframe. A duration of the second plurality of time-frequency resources is shorter than the duration of the subframe.

In a fifth aspect, a program includes instructions (software codes) that, when loaded into a computer, causes the computer to perform the method according to the above-described third or fourth aspect.

Advantageous Effects of Invention

According to the above aspects, it is possible to provide an apparatus, a method, and a program that contribute to enabling a radio base station to communicate with both a radio terminal supporting low latency access and a legacy radio terminal not supporting low latency access.

DESCRIPTION OF EMBODIMENTS

Specific embodiments will be described hereinafter in detail with reference to the drawings. The same or corresponding elements are denoted by the same signs throughout the drawings, and repeated explanations will be omitted as necessary for the sake of clarity.

First Embodiment

Figure 1:
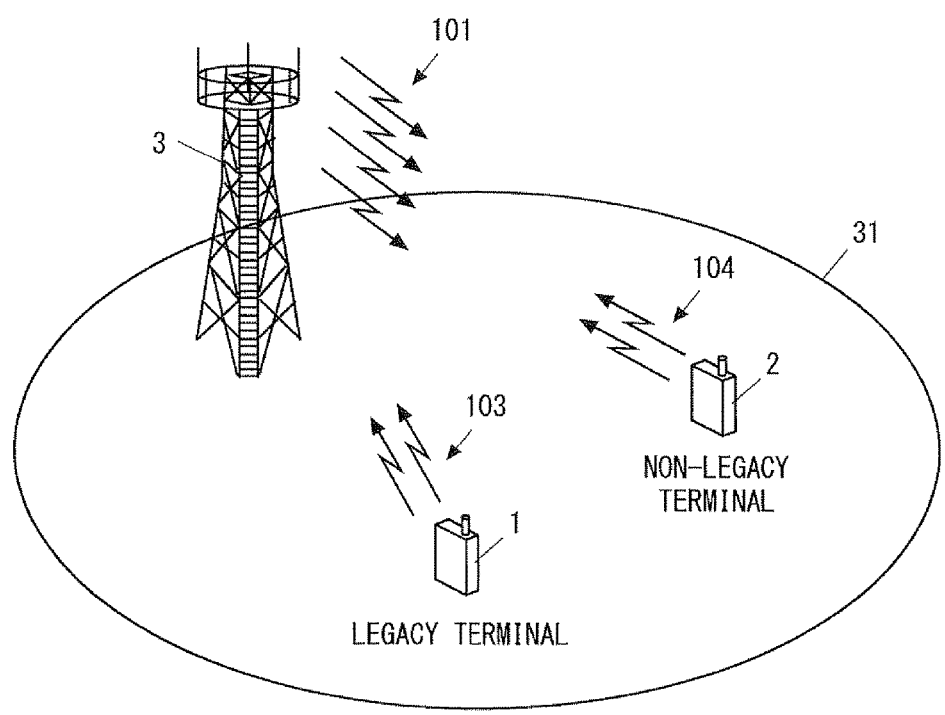
FIG. 1 is a diagram showing a configuration example of a radio communication system according to some embodiments.

FIG. 1 shows a configuration example of a radio communication system according to some embodiments including this embodiment. In the example of FIG. 1, the radio communication system includes a legacy radio terminal (UE) 1, a non-legacy radio terminal (UE) 2, and a radio base station (Base Station (BS)) 3. The BS 3 communicates with the legacy UE 1 and the non-legacy UE 2 in a cell 31. The BS 3 transmits downlink (DL) signals 101 using a downlink (DL) frequency band (DL system bandwidth) of the cell 31. In the case of LTE/LTE-Advanced, the BS 3 corresponds to an eNB. The BS 3 may include a control node having a radio resource management function and a radio transmission node. The control node is, for example, a Radio Network Controller (RNC) in Universal Mobile Telecommunications System (UMTS) or a Base Station Controller (BSC) in Global System for Mobile communications (GSM (registered trademark)) system. The radio transmission node is, for example, a NodeB in UMTS or a Base transceiver station (BTS) in GSM system. The BS 3 according to this embodiment can be referred to as a radio station.

The legacy UE 1 transmits uplink (UL) signals 103 to the BS 3 using an uplink frequency band (UL system bandwidth) of the cell 31. Likewise, the non-legacy UE 2 also transmits uplink (UL) signals 104 to the BS 3 using this UL system bandwidth. In a plurality of embodiments including this embodiment, the case of Frequency Division Duplex (FDD), in which the DL system bandwidth used for the DL signals 101 differs from the UL system bandwidth used for the UL signals 103 and 104, will be mainly used for the description. However, the embodiments including this embodiment can be applied to TDD.

As already described above, low latency access is radio communication in which some kind of access latency is reduced as compared with existing radio communication (i.e., normal access). In the embodiments including this embodiment, first access corresponding to the normal access and second access corresponding to the low latency access are used. The first access is defined as data transmission and reception performed in accordance with a first TTI (e.g., 1 ms). The second access is defined as data transmission and reception performed in accordance with a second TTI (e.g., 0.5 ms). The first TTI is equal to the duration of one subframe (i.e., DL subframe and UL subframe) used for transmitting the DL signals 101 and the UL signals 103 and 104. On the other hand, the second TTI is shorter than the first TTI and is thus shorter than the duration of one subframe (subframe duration). For example, the second TTI may be equal to the duration of one time slot among a plurality of time slots constituting the subframe or may be an integer multiple of a symbol length (but shorter than the subframe duration).

In some implementations, the first TTI may be the minimum unit of a transmission time allocated by a single scheduling grant to a UE that performs the first access. Similarly, the second TTI may be the minimum unit of a transmission time allocated by a single scheduling grant to a UE that performs the second access.

The legacy UE 1 does not support the second access and instead performs the first access. On the other hand, the non-legacy UE 2 supports the second access. The non-legacy UE 2 may only support the second access or may support both the first access and the second access. If the non-legacy UE 2 supports both the first access and the second access, the non-legacy UE 2 may use the second access, for example, when it performs data transmission or reception requiring low latency.

In some implementations, the first access (i.e., UL data transmission or DL data reception in accordance with the first TTI) and the second access (i.e., UL data transmission or DL data reception in accordance with the second TTI) may be performed within one subframe. In this case, the BS 3 performs both DL data transmission (or UL data reception) in accordance with the first TTI and DL data transmission (or UL data reception) in accordance with the second TTI within one subframe. In one example, the legacy UE 1 performs the first access and the non-legacy UE 2 performs the second access. In another example, one non-legacy UE 2 performs the first access and the same or different non-legacy UE 2 performs the second access.

In some implementations, the first access may be performed in one subframe and the second access may be performed in another subframe. In this case, in each subframe, the BS 3 performs either DL data transmission (or UL data reception) in accordance with the first TTI or DL data transmission (or UL data reception) in accordance with the second TTI. In a subframe where the first access is performed, the legacy UE 1 or both the legacy UE 1 and the non-legacy UE 2 perform UL data transmission or DL data reception. In a subframe where transmission in accordance with the second TTI is performed, the non-legacy UE 2 performs UL data transmission or DL data reception.

As has been described above, the subframe is composed of a plurality of time-frequency resources and has a predetermined duration. The duration of one subframe (i.e., subframe duration) means a length of time (time length) over which a subframe continues or lasts. Further, the TTI is defined as a length of time (time length) over which one transport block is transmitted. The transport block is a data unit (i.e., MAC PDU) passed from the Medium Access Control (MAC) layer to the physical layer. In the physical layer of the transmitter, the entire transport block is used to calculate error detection bits (e.g., CRC parity bits) and the calculated error detection bits are added to the transport block. Channel coding in the physical layer is performed on the transport block to which the error detection bits have been added. Further, in the physical layer processing in the transmitter, interleaving is performed on the coded bit sequence generated from one transport block. Accordingly, the receiver needs to receive at least one TTI data (i.e., data corresponding to the transport block and the error detection bits added thereto) in order for the receiver to be able to perform deinterleaving and decoding. In this description, the transmitter is the BS 3 in the case of DL transmission and is the legacy UE 1 and the non-legacy UE 2 in the case of UL transmission. On the other hand, the receiver is the legacy UE 1 and the non-legacy UE 2 in the case of DL reception and is the BS 3 in the case of UL reception.

Note that when Multiple Input/Multiple Output (MIMO) spatial multiplexing is used, a UE (legacy UE 1 or non-legacy UE 2) can transmit a plurality of transport blocks per subframe. For example, in LTE, a UE potentially transmits up to two transport blocks per subframe. That is, a UE potentially utilizes MIMO spatial multiplexing and thus performs transmission or reception of a plurality of layers through a plurality of antenna ports. However, it should be noted that even when MIMO spatial multiplexing is used, the TTI length for the transport block in each layer is the same as the TTI length when MIMO spatial multiplexing is not used.

In addition, when Carrier Aggregation (CA) in which a UE (legacy UE 1 or non-legacy UE 2) uses a plurality of carriers (Component Carriers (CCs)) simultaneously is performed, the transport block is generated for each carrier (i.e., for each cell). However, it should be noted that even when CA is performed, the TTI length for the transport block transmitted in each CC is the same as the TTI length when CA is not performed.

In some implementations, the transport blocks transmitted via the first access and the second access may be transport blocks that are used for a Data Radio Bearer (DRB) or a Signaling Radio Bearer (SRB) or both. In other words, these transport blocks may be transport blocks used to transmit either or both of user data (e.g., user Internet Protocol (IP) packets) and dedicated control signaling (e.g., Radio Resource Control (RRC) signaling). Specifically, the transport blocks transmitted via the first access and the second access may be Uplink Shared Channel (UL-SCH) transport blocks or Downlink Shared Channel (DL-SCH) transport blocks in LTE and LTE-Advanced. The UL-SCH transport blocks are used for transmitting UL user data (i.e., Dedicated Traffic Channel (DTCH)) and RRC signaling messages (i.e., Common Control Channel (CCCH) and Dedicated Control Channel (DCCH)). The DL-SCH transport blocks are used for transmitting DL user data (i.e., DTCH), RRC signaling messages (i.e., CCCH and DCCH), and System Information Blocks (SIBs) (i.e., part of Broadcast Control Channel (BCCH)).

Figure 2:
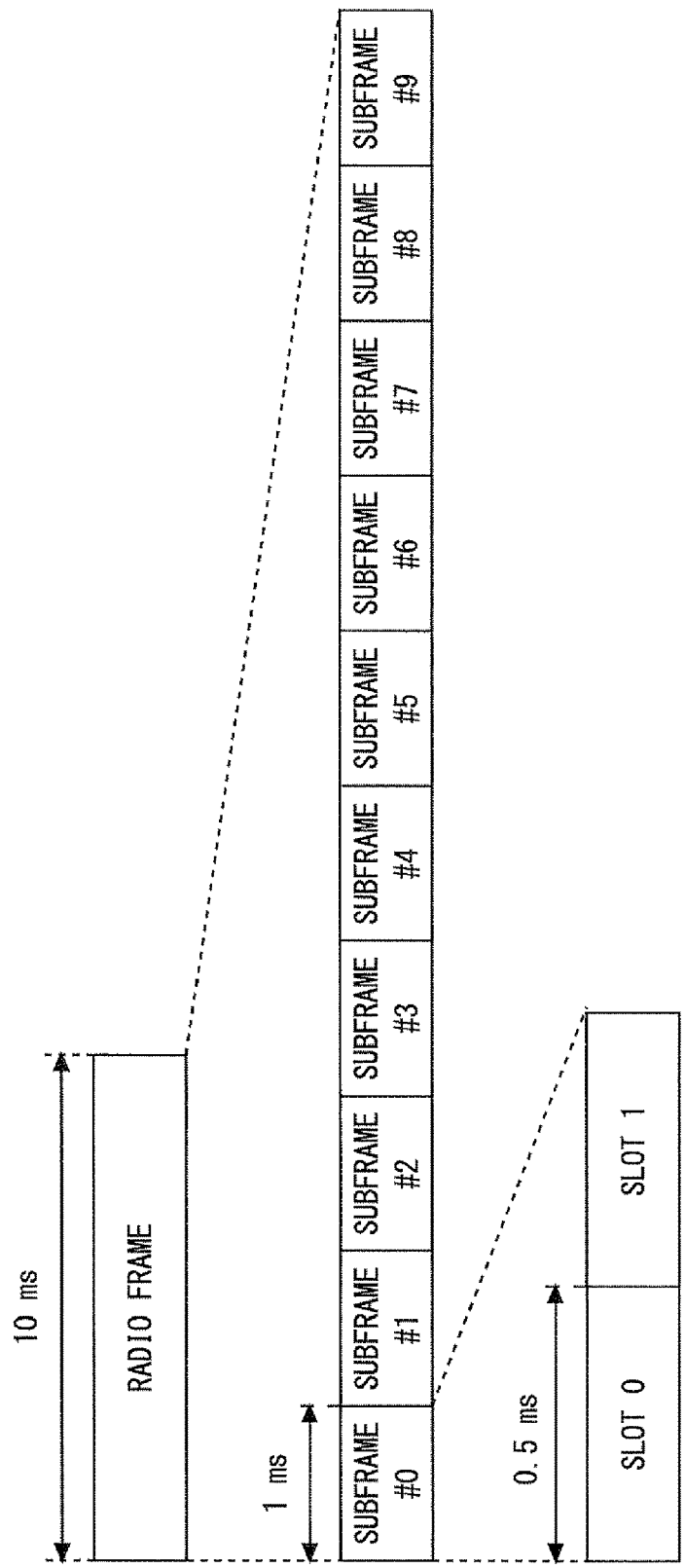
FIG. 2 is a diagram showing a radio frame structure and a subframe structure according to some embodiments.

The subframe according to this embodiment may be the same as that of LTE and LTE-Advanced. The time-frequency resources (radio resources) of LTE will be described with reference to FIGS. 2, 3A, and 3B. FIG. 2 shows a radio frame structure of LTE and LTE-Advanced. In the 3rd Generation Partnership Project (3GPP) Release 8 and subsequent releases, two types of the radio frame structures are specified. One is referred to as a frame structure type 1 and is applied to frequency division duplex (FDD). The other is referred to as a frame structure type 2 and is applied to time division duplex (TDD). As shown in FIG. 2, in both frame structure type 1 and frame structure type 2, the duration of one radio frame is 10 ms, and one radio frame consists of 10 subframes. The duration of one subframe is 1 ms. One subframe is divided into two slots of 0.5 ms each.

Figure 3A:
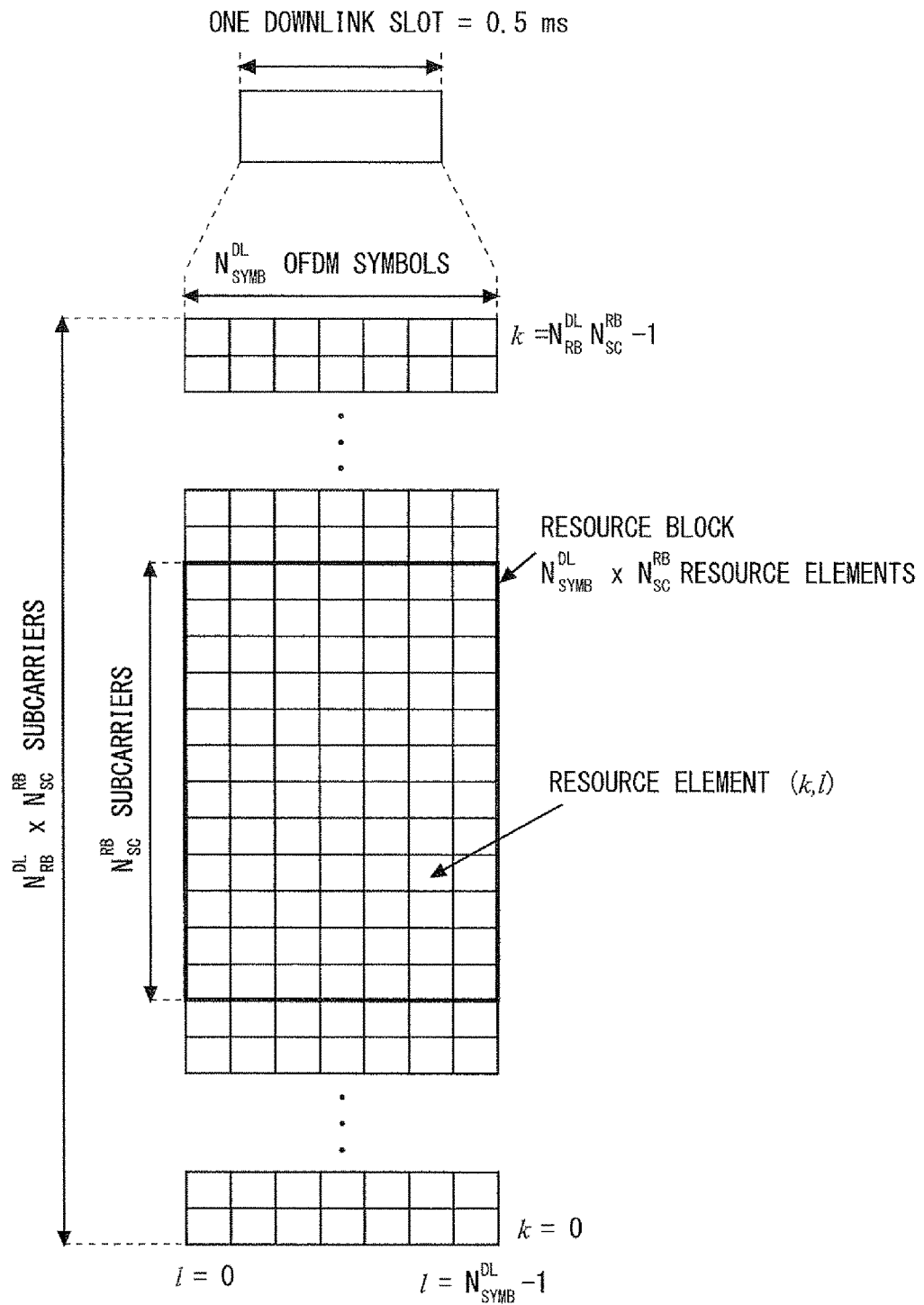
FIG. 3A is a diagram showing a detailed structure of downlink time-frequency resources according to some embodiments.

FIG. 3A shows a detail of downlink time-frequency resources in LTE and LTE-Advanced. One downlink slot (0.5 ms) includes $N^{DL}_{SYMB}$ Orthogonal Frequency Division Multiplexing (OFDM) symbols in the time domain. A radio resource defined by one subcarrier in the time domain and one OFDM symbol in the frequency domain is referred to as a "resource element". The resource element is the minimum unit of radio resources in the downlink of LTE and LTE-Advanced using OFDM. The unit of resources defined by $N^{DL}_{SYMB}$ consecutive OFDM symbols in the time domain and $N^{RB}_{SC}$ consecutive subcarriers in the frequency domain is referred to as a "resource block". In the case of normal cyclic prefix, the value of $N^{DL}_{SYMB}$ is 7 and the value of $N^{RB}_{SC}$ is 12 and, therefore, one downlink resource block consists of 84 resource elements. The occupied bandwidth (i.e., $N^{DL}_{RB}$ resource blocks or $N^{DL}_{RB} N^{RB}_{SC}$ subcarriers) depends on the downlink channel bandwidth ($BW_{channel}$). For example, if the channel bandwidth is 1.4 MHz, the maximum number of downlink resource blocks ($N^{DL}_{RB}$) is six, and if the channel bandwidth is 20 MHz, the maximum number of downlink resource blocks ($N^{DL}_{RB}$) is 100. Note that, in the downlink, a physical control channel (PDCCH) for transmitting control information is allocated to OFDM symbols (e.g., 1, 2, or 3) at the beginning of the subframe. Therefore, the number of OFDM symbols normally used to transmit user data in the downlink differs between the first and second slots.

Figure 3B:
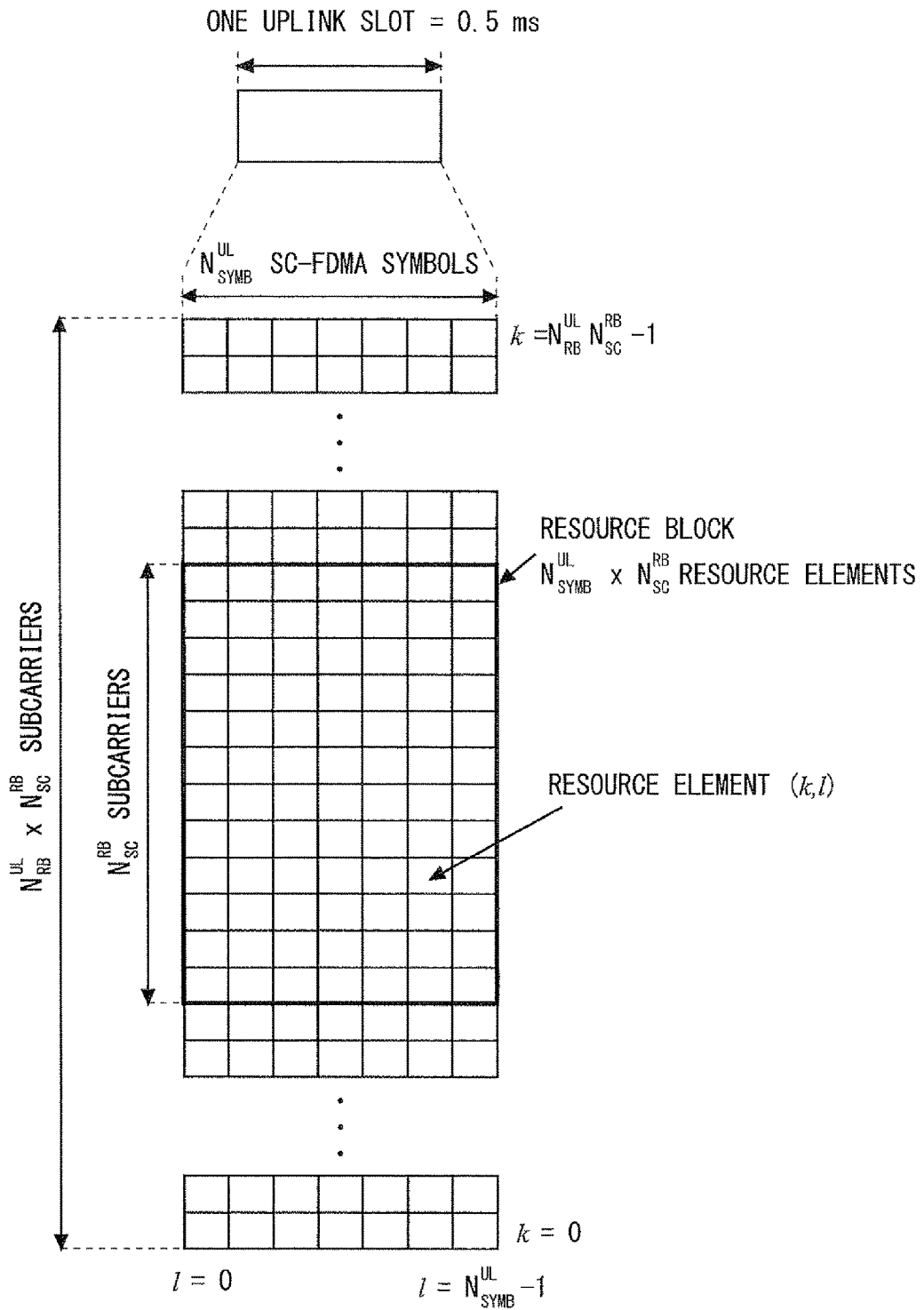
FIG. 3B is a diagram showing a detailed structure of uplink time-frequency resources according to some embodiments.

FIG. 3B shows the details of the uplink time-frequency resource in LTE and LTE-Advanced. One uplink slot (0.5 ms) includes $N^{UL}_{SYMB}$ Single-Carrier Frequency Division Multiple Access (SC-FDMA) symbols in the time domain. Like in the downlink, a radio resource defined by one SC-FDMA symbol in the time domain and one subcarrier in the frequency domain is referred to as a "resource element". The resource element is the minimum unit of radio resources in the uplink of LTE and LTE-Advanced using SC-FDMA. The unit of resources defined by $N^{UL}_{SYMB}$ consecutive SC-FDMA symbols in the time domain and $N^{RB}_{SC}$ consecutive subcarriers in the frequency domain is referred to as a "resource block". Like in the downlink, in the case of normal cyclic prefix, the value of $N^{UL}_{SYMB}$ is 7 and the value of $N^{RB}_{SC}$ is 12 and, thus, one uplink resource block consists of 84 resource elements. The occupied bandwidth (i.e., $N^{UL}_{RB}$ resource blocks or $N^{UL}_{RB} N^{RB}_{SC}$ subcarriers) depends on the uplink channel bandwidth ($BW_{Channel}$). For example, if the channel bandwidth is 1.4 MHz, the maximum number of uplink resource blocks ($N^{UL}_{RB}$) is 6, and if the channel bandwidth is 20 MHz, the maximum number of uplink resource blocks ($N^{UL}_{RB}$) is 100.

In order to enable the first access and the second access, the BS 3 according to this embodiment is configured to allocate a first plurality of time-frequency resources and a second plurality of time-frequency resources to at least one radio terminal (i.e., to the non-legacy UE 2 or to both the legacy UE 1 and the non-legacy UE 2). Each time-frequency resource included in the first plurality of time-frequency resources and the second plurality of time-frequency resources is the minimum resource unit. Each time-frequency resource may be, for example, a radio resource defined by one symbol in the time domain and one subcarrier in the frequency domain (e.g., a resource element in LTE/LTE-Advanced).

In some implementations, the BS 3 may allocate the first plurality of time-frequency resources and the second plurality of time-frequency resources to different UEs. For example, the BS 3 may allocate the first plurality of time-frequency resources to the legacy UE 1 and the second plurality of time-frequency resources to the non-legacy UE 2. Additionally or alternatively, the BS 3 may allocate the first plurality of time-frequency resources and the second plurality of time-frequency resources to the same UE (the non-legacy UE 2).

The first plurality of time-frequency resources are used to transmit or receive a first transport block in accordance with the first TTI (e.g., 1 ms). On the other hand, the second plurality of time-frequency resources are used to transmit or receive a second transport block in accordance with the second TTI (e.g., 0.5 ms).

Note that the entire first transport block is used to calculate first error detection bits (e.g., CRC parity bits) and the first error detection bits are added to the first transport block. Similarly, the entire second transport block is used to calculate second error detection bits (e.g., CRC parity bits) and the second error detection bits are added to the second transport block. Therefore, strictly speaking, the first plurality of time-frequency resources are used to transmit or receive the first transport block and the first error detection bits added thereto in accordance with the first TTI (e.g., 1 ms). The second plurality of time-frequency resources are used to transmit or receive the second transport block and the second error detection bits added thereto in accordance with the second TTI (e.g., 1 ms).

As already mentioned, the first TTI is equal to the duration of one subframe (i.e., subframe duration). Accordingly, the duration of the first plurality of time-frequency resources corresponds to the duration of one subframe. The duration of the first plurality of time-frequency resources means the entire length of time (time length) over which these time-frequency resources continue or last. The duration of the first plurality of time-frequency resources does not need to exactly match the duration of one subframe (e.g., 1 ms). This is because particular time-frequency resources in a subframe are reserved for Synchronization Signals (SS), Reference Signals (RS), control information channels (e.g., Physical Downlink Control Channel (PDCCH), Enhanced PDCCH (EPDCCH), or Physical Uplink Control Channel (PUCCH) in LTE and LTE-Advanced) or a broadcast information channel (e.g., Physical Broadcast Channel (PBCH) in LTE and LTE-Advanced). Specifically, in the case of the downlink subframe in LTE and LTE-Advanced, the resource elements of the first to third symbols at the beginning of the subframe are used for PDCCH, and some resource elements distributed in fourth to fourteenth symbols are used for SS, RS, and PBCH. Thus, the expression that the duration of the first plurality of time-frequency resources "corresponds" to the duration of one subframe means that the duration of the first plurality of time-frequency resources is equal to the duration of one subframe excluding a symbol time used for other purposes such as PDCCH transmission or the like. In other words, the duration of the first plurality of time-frequency resources is equal to the duration of one subframe minus the symbol time used for other purposes such as PDCCH transmission.

In addition, the first plurality of time-frequency resources may not be consecutive resources in the time-frequency space. In other words, the first plurality of time-frequency resources allows its frequency resources (e.g., subcarriers or resource blocks (RBs)) to be changed during the duration of the first plurality of time-frequency resources for frequency hopping or disturbed mapping. To be more specific, in the case of the 1 ms subframe in LTE and LTE-Advanced, the duration of the first plurality of time-frequency resources includes two temporally consecutive resource blocks (i.e., a pair of resource blocks). One of the two resource blocks (RBs) is arranged in the first slot (0.5 ms), and the other is arranged in the second slot (0.5 ms). Thus, the duration of these two RBs corresponds to a subframe of 1 ms. However, these two RBs may be spaced apart from each other in frequency.

On the other hand, as described above, the second TTI is shorter than the duration of one subframe. Accordingly, the duration of the second plurality of time-frequency resources is shorter than the duration of one subframe. That is, the duration of the second plurality of time-frequency resources is shorter than the duration of the first plurality of time-frequency resources corresponding to the duration of one subframe. The second plurality of time-frequency resources allows its frequency resources (e.g., subcarriers or resource blocks (RBs)) to be changed during the duration of the second plurality of time-frequency resources for frequency hopping or disturbed mapping.

In some implementations, like the subframe in LTE and LTE-Advanced, the subframe according to this embodiment may be composed of a plurality of time slots. Each of the time slots includes a plurality of time-frequency resources. In this case, the second TTI may be equal to the duration of at least one of the time slots. Further, the duration of the second plurality of time-frequency resources may correspond to the second TTI. In other words, the duration of the second plurality of time-frequency resources may correspond to the duration of at least one time slot. The expression that the duration of the second plurality of time-frequency resources "corresponds" to the duration of at least one time slot means that the duration of the second plurality of time-frequency resources is equal to the duration of at least one time slot excluding a symbol time used for other purposes such as PDCCH transmission or the like.

For example, in the case of LTE and LTE-Advanced, a 1 ms subframe includes two slots of 0.5 ms each. In this case, the second TTI may be equal to the duration of one slot (0.5 ms) and, accordingly, the duration of the second plurality of time-frequency resources may correspond to the duration of one slot (0.5 ms).

The non-legacy UE 2 is configured to perform at least a second access operation. The non-legacy UE 2 may be configured to selectively perform a first access operation and the second access operation. The first access operation includes transmitting or receiving the first transport block in accordance with the first TTI. The second access operation includes transmitting or receiving the second transport block in accordance with the second TTI. As has been described in regard to the BS 3, the first transport block is transmitted using the first plurality of time-frequency resources in one subframe. On the other hand, the second transport block is transmitted using the second plurality of time-frequency resources in one subframe.

As already mentioned, the first and second accesses may be performed in one subframe. In other words, the first and second transport block may be transmitted in the same radio frame. Further in other words, the second plurality of time-frequency resources may be allocated within the same subframe as the first plurality of time-frequency resources. Within one subframe, at least some of the second plurality of time-frequency resources may overlap with at least some of the first plurality of time-frequency resources. In this case, the transport block for the first access and the transport block for the second access may be multiplexed onto the same time-frequency resources using Code Division Multiplexing (CDM).

Moreover, multiple second accesses may be performed by one or more non-legacy UEs 2 in one subframe. In this case, the multiple second accesses may be performed using different time-frequency resources. Alternatively, the transport blocks of the multiple second accesses may be multiplexed onto the same time-frequency resources using Code Division Multiplexing (CDM).

The configuration for the second access may be made semi-statically or dynamically. In the case of a semi-static configuration, the BS 3 may notify the non-legacy UE 2 of the configuration using broadcast information (e.g., SIB) or dedicated signaling (e.g., RRC signaling). In the case of a dynamic configuration, the BS 3 may notify the non-legacy UE 2 of the configuration using control information of the MAC layer or the physical layer.

As understood from the above description, the non-legacy UE 2 and the BS 3 according to this embodiment are configured to perform the second access in accordance with the second TTI, which is shorter than the first TTI, in the subframe having the duration equivalent to the first TTI which the first access is performed in accordance with. Therefore, the radio communication system according to this embodiment can perform the first access for the legacy UE 1 and the second access for the non-legacy UE 2 by using the same subframe. The second access allows the receiver to performing reception processing in a short time by using the short second TTI and can therefore contribute to reducing some kind of access latency. Thus, the radio communication system according to this embodiment contributes to enabling the BS 3 to communicate with both the UE 2 supporting low latency access and the legacy UE 1 not supporting low latency access.

Figure 4:
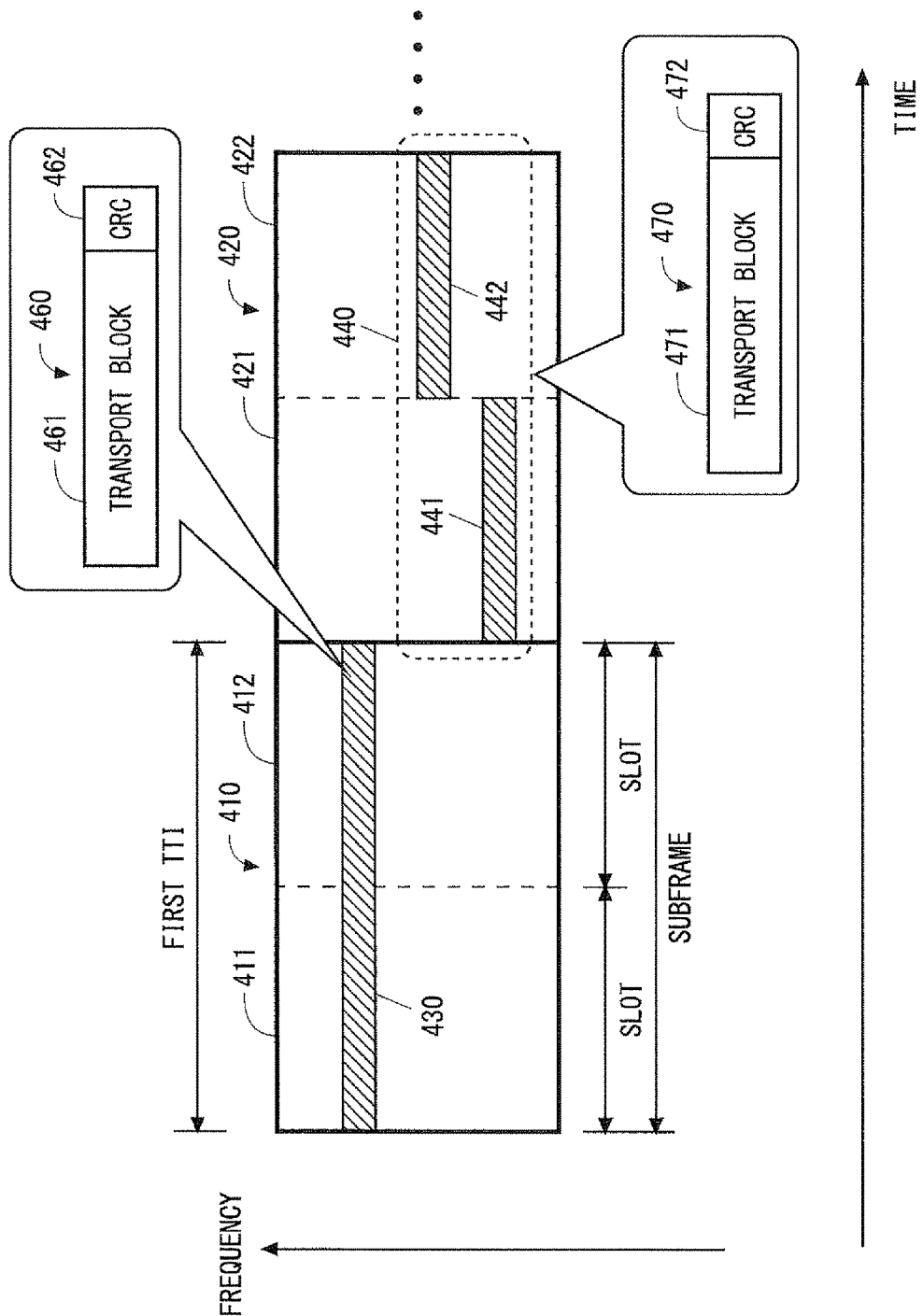
FIG. 4 is a diagram showing an example of allocation of time-frequency resources to a legacy UE according to a first embodiment.

Hereinafter, specific examples of the allocation of time-frequency resources for the first and second accesses will be described with reference to FIGS. 4 and 5. FIG. 4 shows an example of allocating the first plurality of time-frequency resources to the first access. FIG. 4 shows two consecutive subframes 410 and 420 in the time domain. The subframes 410 and 420 are UL subframes or DL subframes. The duration of each subframe 410 and 420 is equal to the first TTI (e.g., 1 ms). The subframe 410 is composed of slots 411 and 412 each having duration equal to half the duration of the subframe 410. Similarly, the subframe 420 is composed of slots 421 and 422.

In the example of FIG. 4, a time-frequency resource 430 in the subframe 410 is allocated to the first access. The time-frequency resource 430 includes a plurality of time-frequency resources (e.g., resource elements or resource blocks). The duration of the time-frequency resource 430 corresponds to the duration of the subframe 412 (i.e., the first TTI). The time-frequency resource 430 is used by the legacy UE 1 (or the non-legacy UE 2) to transmit or receive a CRC-parity-bits-added transport block 460. The CRC-parity-bits-added transport block 460 includes a transport block 461 and CRC parity bits 462.

As already described, the physical layer process at the transmitter, including calculation of error detection bits, channel coding, and interleaving, is performed on one transport block (MAC PDU) 461. Therefore, in order to perform deinterleaving, decoding and error detection and then obtain the transport block 461, the receiver at the legacy UE 1 (or the non-legacy UE 2) or the BS 3 needs to receive the entire time-frequency resource 430 corresponding to the transport block 461. That is, in the example of FIG. 4, the receiver at the legacy UE 1 (or the non-legacy UE 2) or the BS 3 can obtain the transport block 461 after receiving until the end of the subframe 410 corresponding to the first TTI.

The subframe 420 represented in FIG. 4 shows an example in which frequency hopping or distributed mapping is performed. That is, a time-frequency resource 440 is composed of a time-frequency resource 441 of 0.5 ms and a time-frequency resource 442 of 0.5 ms. The time-frequency resources 441 and 442 are spaced apart from each other in frequency. It should be noted that in order to perform deinterleaving, decoding, and error detection based on the CRC parity bits 472 and then obtain the transport port block 471, the receiver at the legacy UE 1 (or the non-legacy UE 2) or the BS 3 needs to receive the entire time-frequency resource 440 corresponding to the transport block 471. This is because the first TTI is equal to the duration of the subframe 420 and hence the CRC-parity-bits-added transport block 470 is transmitted using the entire time-frequency resource 440 after it has been subjected to the channel coding and interleaving.

Note that some time-frequency resources in the subframes shown in FIG. 4 may be used for other purposes such as transmission of control channels and synchronization signals. For example, in the case of LTE/LTE-Advanced, the first to third symbols at the beginning of the subframe are used as the PDCCH region. Therefore, if the subframes 410 and 420 shown in FIG. 4 are DL subframes of LTE/LTE-Advanced, each of the time-frequency resources 430 and 440 allocated for the first access are time-frequency resources excluding the first to third symbols at the beginning of the subframe. As has been described above, the expression that the duration of the first plurality of time-frequency resources 430 (440) "corresponds" to the duration of the subframe 410 (420) (i.e., the first TTI) means that the duration of the first plurality of time-frequency resources 430 (440) is equal to the duration of one subframe excluding a symbol time used for other purposes such as PDCCH transmission or the like.

Figure 5:
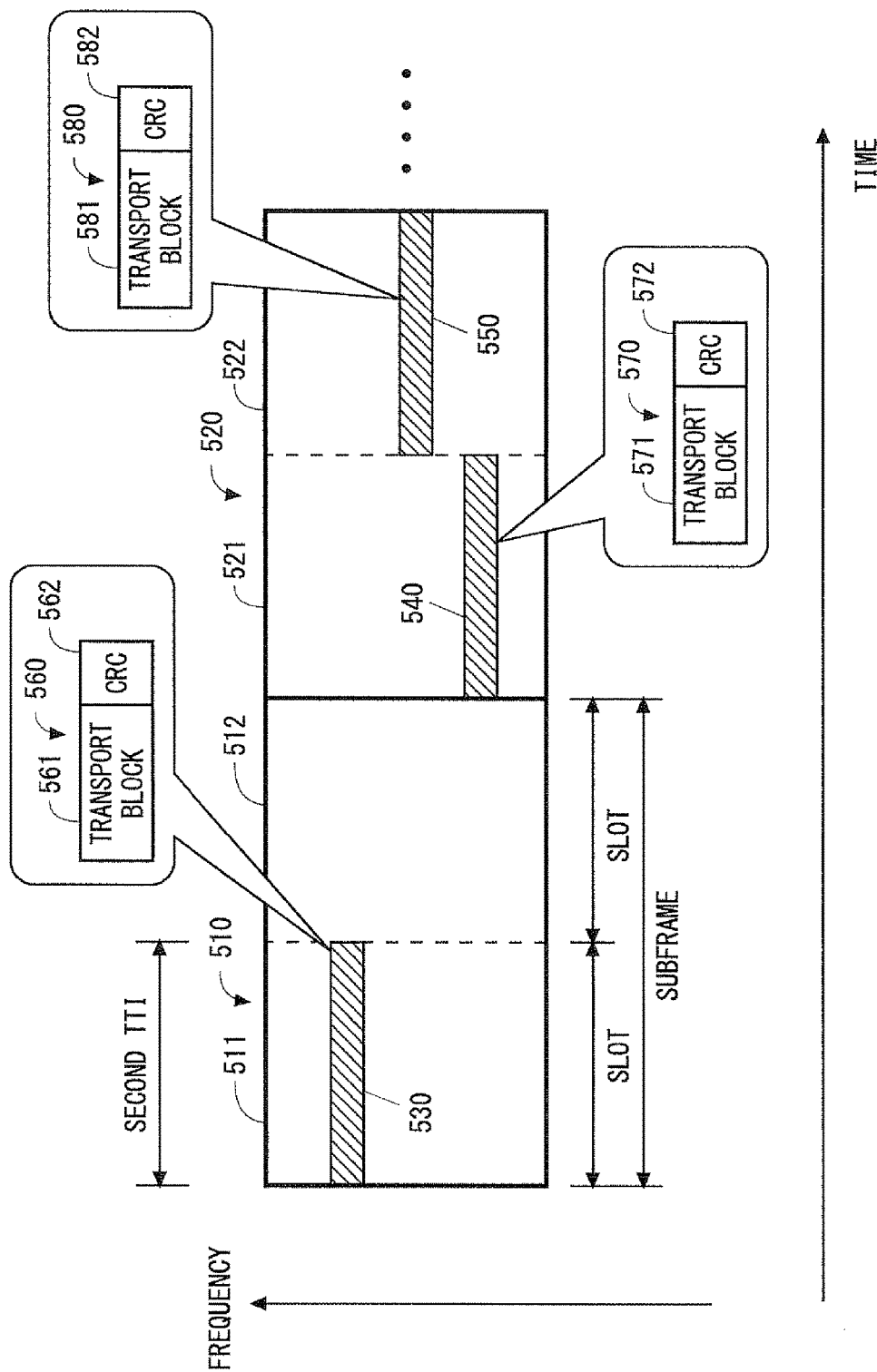
FIG. 5 is a diagram showing an example of allocation of time-frequency resources to a non-legacy UE according to the first embodiment.

FIG. 5 shows an example of allocating the second plurality of time-frequency resources to the second access by the non-legacy UE 2. FIG. 5 shows two consecutive subframes 510 and 520 in the time domain. The subframes 510 and 520 are UL subframes or DL subframes. The subframe 510 is composed of slots 511 and 512 each having duration equal to half the duration of subframe 510. Similarly, the subframe 520 is composed of slots 521 and 522. In the example of FIG. 5, the second TTI is half the subframe duration (e.g., 1 ms) and is equal to the duration of each of the slots 511, 512, 521, and 522 (e.g., 0.5 ms).

In the example of FIG. 5, a time-frequency resource 530 in the subframe 510 is allocated to the second access by the non-legacy UE 2. The time-frequency resource 530 includes a plurality of time-frequency resources (e.g., resource elements or resource blocks). The duration of the time-frequency resource 530 corresponds to the duration of the slot 511 (i.e., the second TTI). The time-frequency resource 530 is used by the non-legacy UE 2 to transmit or receive a CRC-parity-bits-added transport block 560. The CRC-parity-bits-added transport block 560 includes a transport block 561 and CRC parity bits 562.

In order to perform deinterleaving, decoding, and error detection and then obtain the transport port block 561, the receiver at the non-legacy UE 2 or the BS 3 needs to receive only the time-frequency resource 530 corresponding to the transport block 561. In comparing FIG. 4 to FIG. 5, the second TTI of FIG. 5 is half the length of the first TTI of FIG. 4. Thus, the non-legacy UE 2 can perform reception processing including deinterleaving, decoding, and error detection and then obtain the transport block 561 after receiving only the time-frequency resource 530 having a one-slot length.

The subframe 520 represented in FIG. 5 shows an example in which transmission for the second access is performed in each of the first slot 521 and the second slot 522 in the subframe 520. The time-frequency resource 540 in the first slot 521 is used by the non-legacy UE 2 to transmit or receive a CRC-parity-bits-added transport block 570. On the other hand, the time-frequency resource 550 in the second slot 522 is used by the non-legacy UE 2 to transmit or receive a CRC-parity-bits-added transport block 580. The time-frequency resources 540 and 550 may be allocated to the same non-legacy UE 2 or may be allocated to different non-legacy UEs 2.

After receiving only the time-frequency resource 540, the non-legacy UE 2 can perform reception processing including deinterleaving, decoding, and error detection based on CRC parity bits 572 and then obtain a transport block 571. Likewise, after receiving only the time-frequency resource 550, the non-legacy UE 2 can perform reception processing including deinterleaving, decoding, and error detection based on CRC parity bits 582 and then obtain a transport block 581.

Note that some time-frequency resources in the subframes shown in FIG. 5 may be used for other purposes such as transmission of control channels and synchronization signals. If the subframes 510 and 520 shown in FIG. 5 are DL subframes of LTE/LTE-Advanced, each of the time-frequency resources 530, 540, and 550 allocated for the first access are time-frequency resources excluding the first to third symbols at the beginning of the subframe. As has been described above, the expression that the duration of the second plurality of time-frequency resources 530 (540, 550) "corresponds" to the duration of the slot 511 (521, 522) (i.e., the second TTI) means that the duration of the second plurality of time-frequency resources 530 (540, 550) is equal to the duration of one subframe excluding a symbol time used for other purposes such as PDCCH transmission or the like.

In the example shown in FIG. 5, frequency hopping or distributed mapping may be performed in each slot. For example, the time-frequency resource 530 may include two or more resource segments spaced apart from each other in frequency.

In the example in FIG. 5, each subframe may be composed of three or more time slots. In this case, the duration of each of the time-frequency resources 530, 540, and 550 may correspond to the duration of one or more time slots.

Hereinafter, an improvement to a Scheduling Request (SR) for UL transmission will be described. In some implementations, the non-legacy UE 2 may transmit a Scheduling Request (SR) to request BS 3 to allocate UL transmission resources. The non-legacy UE 2 may transmit an SR for the second access using a plurality of time-frequency resources having a shorter duration than those used for transmission of an SR for the first access.

In some implementations, in the case of the first access, the non-legacy UE 2 may transmit Uplink Control Information (UCI) containing an SR using a third plurality of time-frequency resources in a subframe. The duration of the third plurality of time-frequency resources corresponds to the duration of one subframe. On the other hand, in the case of the second access, the non-legacy UE 2 may transmit Uplink Control Information (UCI) containing an SR using a fourth plurality of time-frequency resources in a subframe. The duration of the fourth plurality of time-frequency resources is shorter than the duration of one subframe. For example, the duration of the fourth plurality of time-frequency resources may be the same as or shorter than the duration of the second TTI.

By transmitting an SR for the second access in a shorter time than that taken to transmit an SR for the first access, the BS 3 is more likely to initiate transmitting of the UL scheduling grant in response to the SR for the second access at an earlier timing. This contributes to reducing some kind of access latency.

Figure 6:
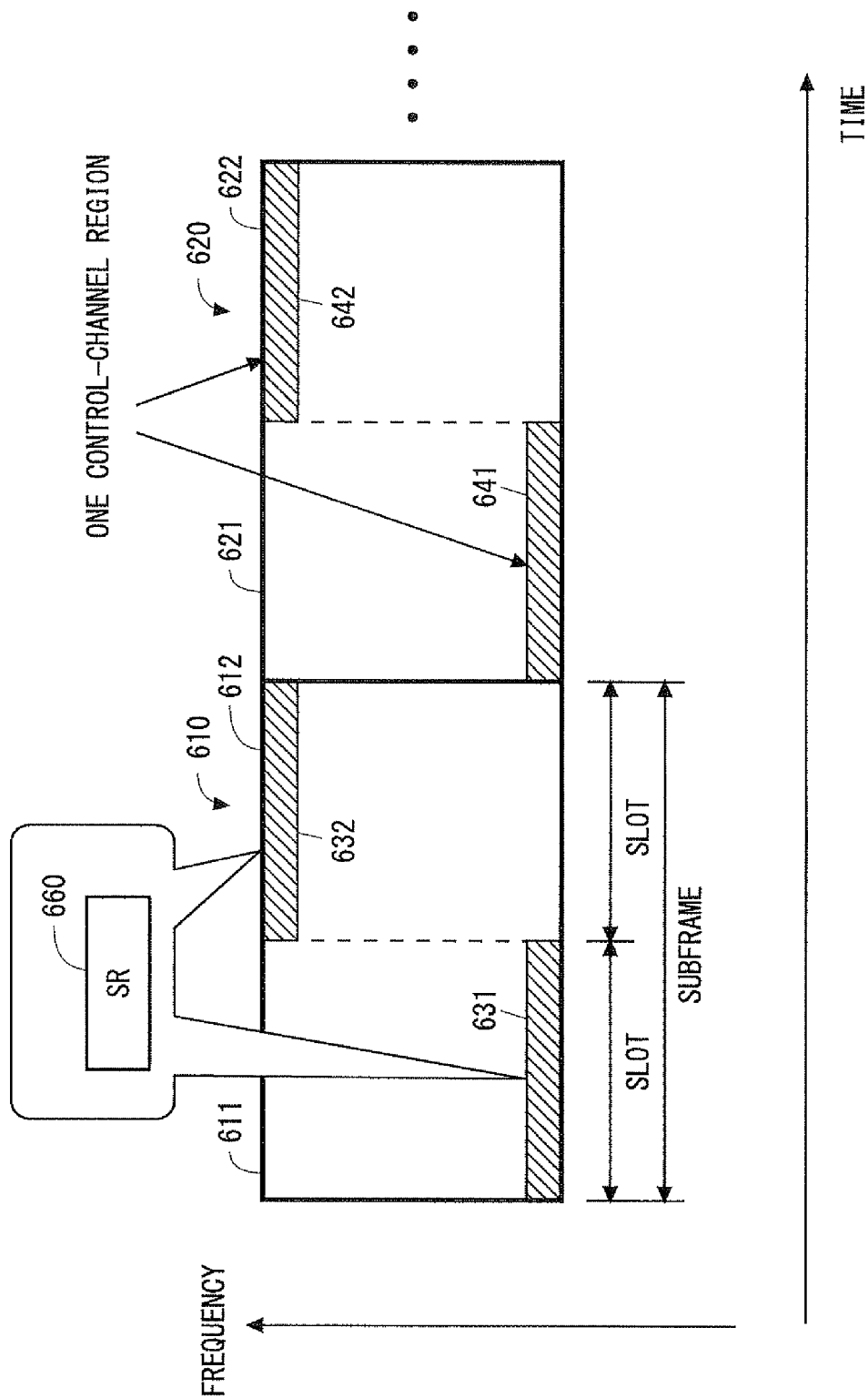
FIG. 6 is a diagram showing an example of allocation of time-frequency resources to a legacy UE according to the first embodiment.

Specific examples of allocation of uplink time-frequency resources to transmit an SR will be described with reference to FIGS. 6 and 7. FIG. 6 shows an example of allocation of the third plurality of time-frequency resources to transmit an SR for the first access. FIG. 6 shows two consecutive UL subframes 610 and 620 in the time domain. The UL subframe 610 is composed of slots 611 and 612 each having duration equal to half the duration of the subframe 610. Similarly, the subframe 620 is composed of slots 621 and 622.

In the example shown in FIG. 6, like the arrangement of the PUCCH regions in LTE and LTE-Advanced, resources positioned near both ends of the UL system bandwidth are used for control channels. More specifically, an SR 660 is transmitted using time-frequency resources 631 and 632 in the subframe 610. The duration of the pair of time-frequency resources 631 and 632 allocated to one UE (UE 1 or UE 2) is equal to the duration of one subframe. The pair of time-frequency resources 631 and 632 is referred to as a control channel region (e.g., PUCCH region). A pair of time-frequency resources 641 and 642 in the subframe 620 is also a control channel region and can be used to transmit an SR.

Figure 7:
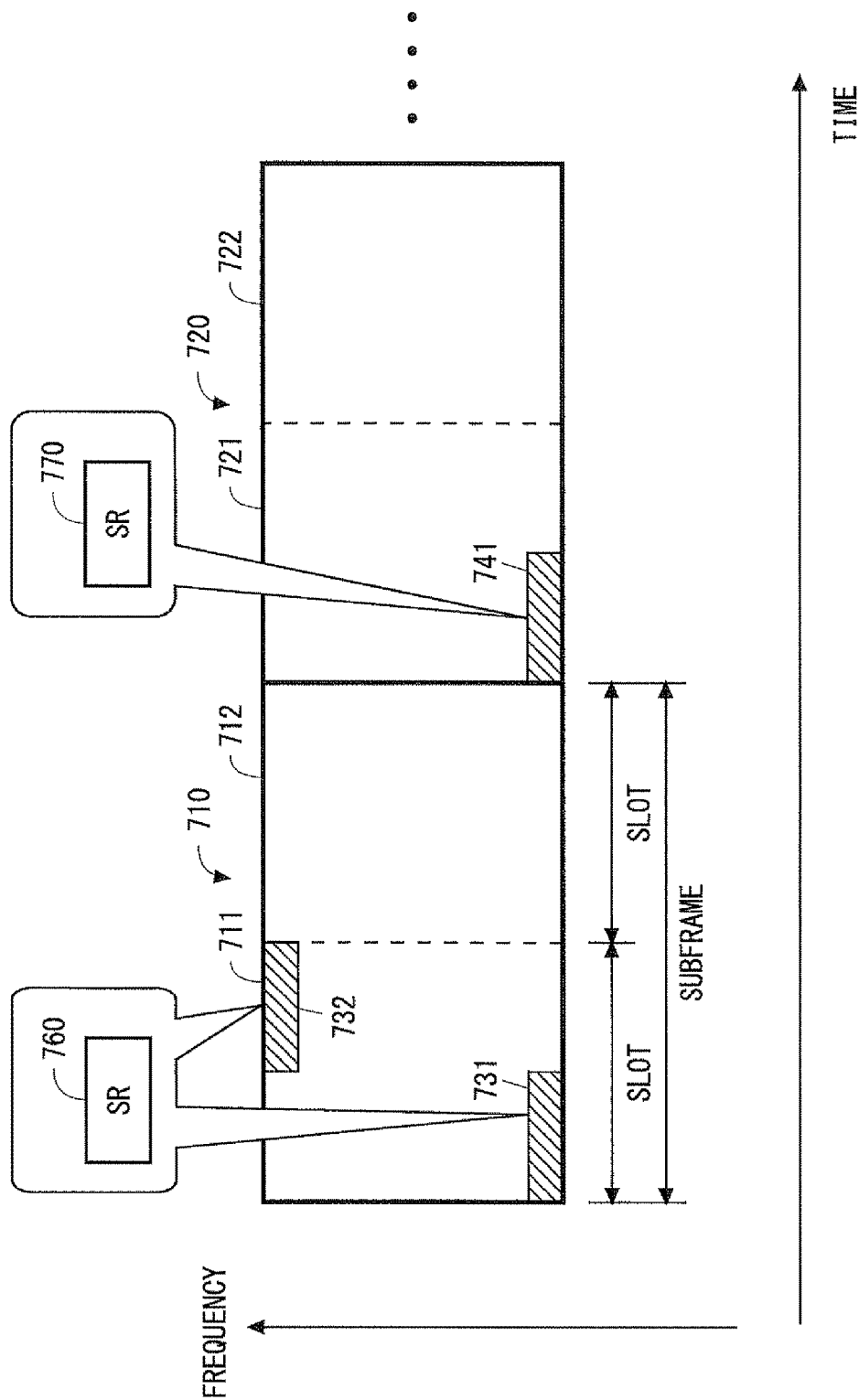
FIG. 7 is a diagram showing an example of allocation of time-frequency resources to a non-legacy UE according to the first embodiment.

FIG. 7 shows an example of allocation of the fourth plurality of time-frequency resources to transmit an SR for the second access. FIG. 7 shows two consecutive UL subframes 710 and 720 in the time domain. The UL subframe 710 is composed of slots 711 and 712 each having duration equal to half the duration of the subframe 710. Similarly, the subframe 720 is composed of slots 721 and 722.

Also in the example of FIG. 7, resources positioned near both ends of the UL system bandwidth are used for control channels like the arrangement in the PUCCH regions in LTE and LTE-Advanced. More specifically, an SR 760 is transmitted using time-frequency resources 731 and 732 in one slot 711. The duration of the pair of time-frequency resources 731 and 732 allocated to one non-legacy UE 2 is equal to the duration of one slot. Thus, in the example of FIG. 7, the transmission of an SR can be completed in a shorter time than in the example of FIG. 6. The duration of the time-frequency resource 731 may be the same as or differ from that of the time-frequency resource 732. For example, like the slots of LTE and LTE-Advanced, if the number of resource elements in one slot is an odd number (e.g., seven symbols), the segments (731 and 732) obtained by dividing these resource elements by an even number may have different durations from each other.

Further, as shown in the subframe 720 represented in FIG. 7, an SR may be transmitted in a time shorter than half the duration of one subframe. In this example, an SR 770 is transmitted using a time-frequency resource 741.

The time-frequency resources 731, 732, and 741 allocated to the non-legacy UE 2 for the second access may be multiplexed using time division multiplexing (TDM) to the time-frequency resources 631, 632, 641, and 642 allocated to the legacy UE 1 for the first access on a subframe-to-subframe basis. That is, in one subframe, particular time-frequency resources may be allocated to the non-legacy UE 2 for the second access, while in another subframe, these particular time-frequency resources may be allocated to the legacy UE 1 for the first access. Alternatively, the time-frequency resources 731, 732, and 741 allocated to the non-legacy UE 2 for the second access may be multiplexed using frequency division multiplexing (FDM) to the time-frequency resources 631, 632, 641, and 642 allocated to the legacy UE 1 for the first access in one subframe.

Figure 8A:
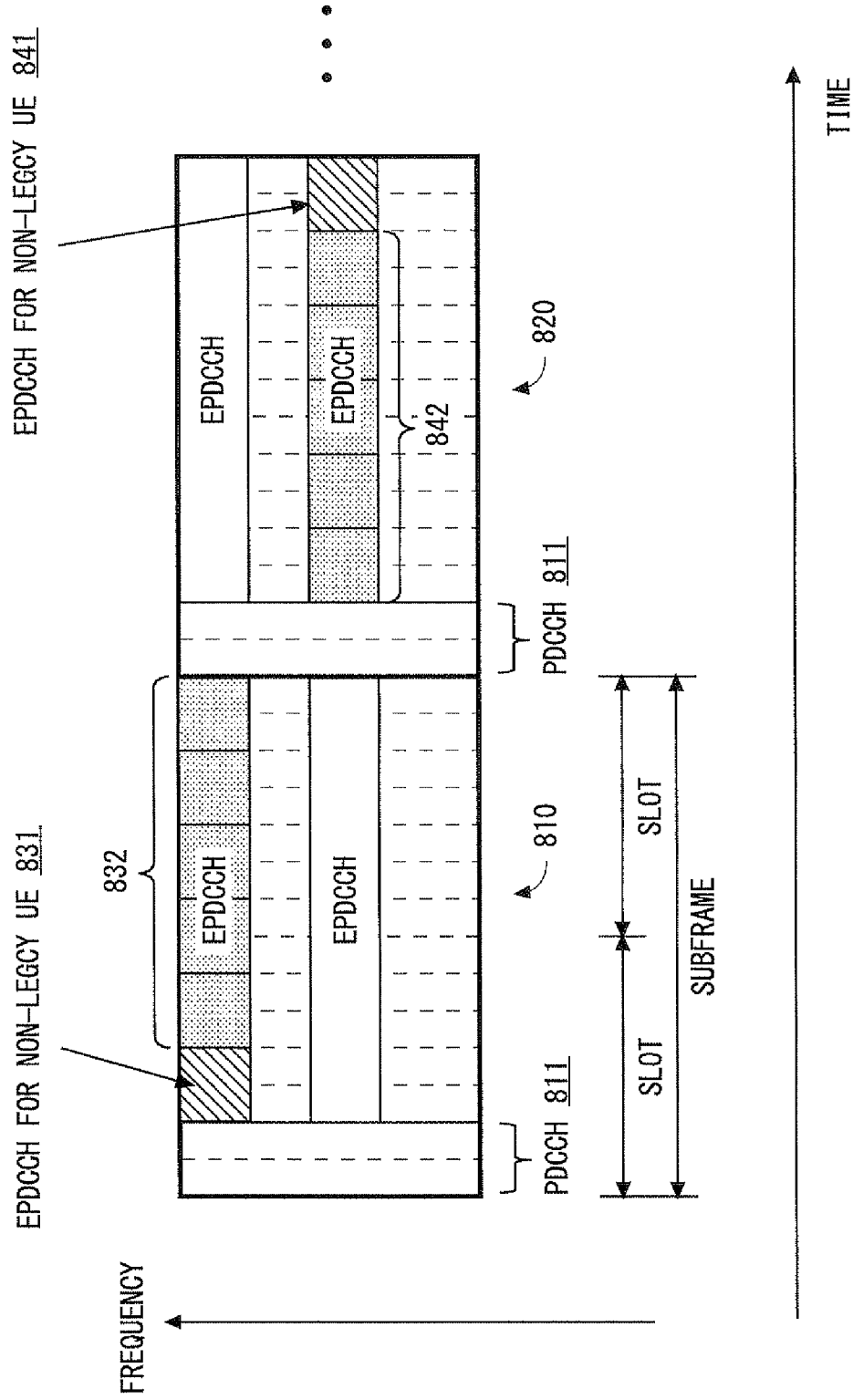
FIG. 8A is a diagram showing an example of allocation of time-frequency resources to a non-legacy UE according to the first embodiment.
Figure 8B:
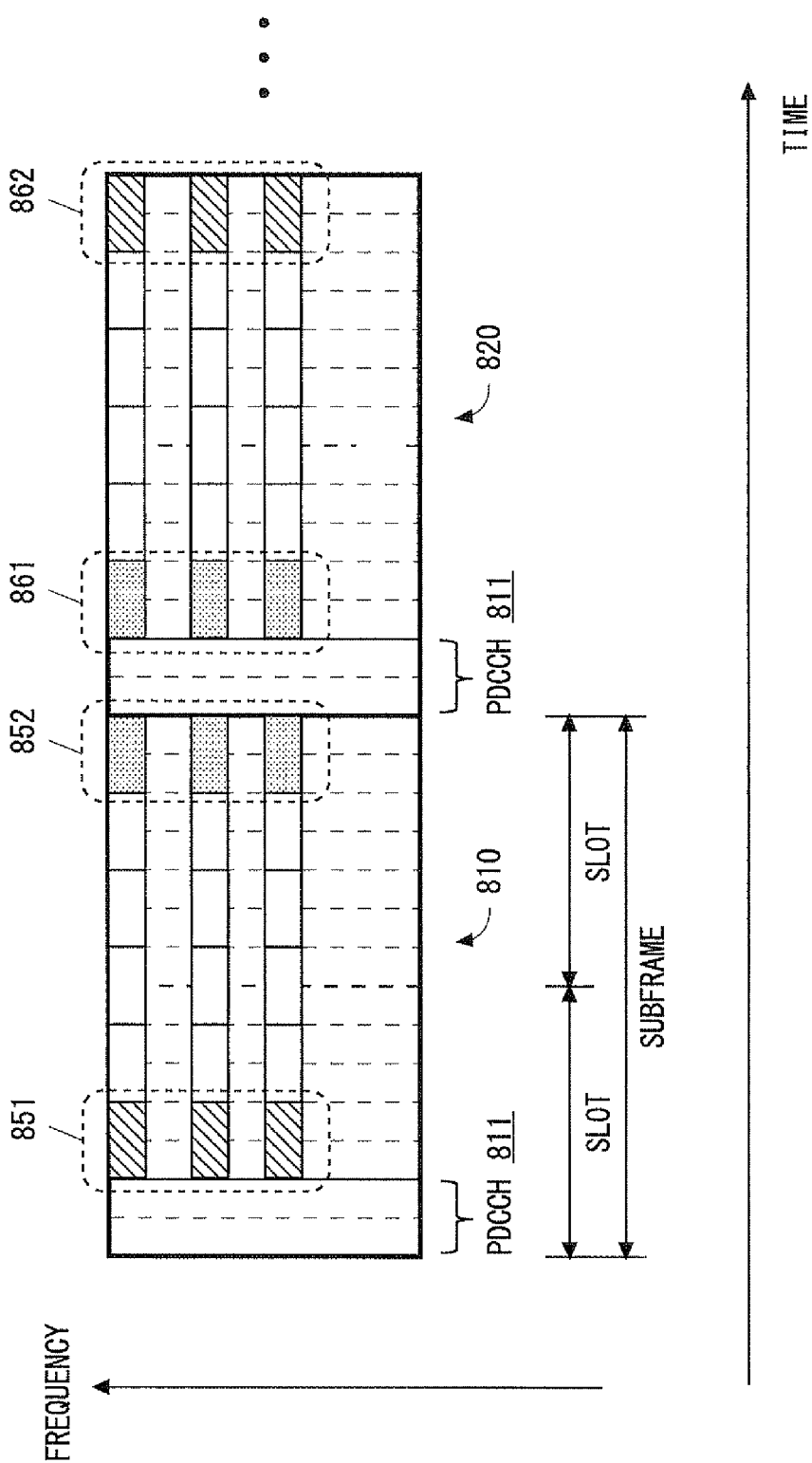
FIG. 8B is a diagram showing an example of allocation of time-frequency resources to a non-legacy UE according to the first embodiment.

Hereinafter, specific examples of allocation of downlink time-frequency resources to transmit a UL scheduling grant (UL grant) will be described with reference to FIGS. 8A and 8B. FIGS. 8A and 8B show examples of allocation of a plurality of downlink time-frequency resources to transmit a UL grant for the second access. LTE-Advanced specifies two EPDCCH transmission schemes, i.e., localized transmission (mapping) and distributed transmission (mapping). FIG. 8A relates to localized mapping and shows two temporally consecutive subframes 810 and 820. In the example of FIG. 8A, in order to enable Downlink Control Information (DCI) containing a UL grant and the like to be transmitted in a shorter time than in the existing LTE-Advanced, TDM is performed on localized-mapped EPDCCH in one subframe. That is, a time-frequency resource 831 (841) having two-symbol duration in an EPDCCH region is allocated to the non-legacy UE 2 and used for transmission of a UL grant. The remaining resources 832 (842) in the same EPDCCH region as the resource 831 (841) may be allocated to the same non-legacy UE 2 as the resource 831 (841) or may be allocated to another non-legacy UE 2.

On the other hand, FIG. 8B relates to distributed transmission (mapping). In the example of FIG. 8B, in order to enable downlink control information (DCI) containing a UL grant and the like to be transmitted in a shorter time than in the existing LTE-Advanced, TDM is performed on distributed-mapped EPDCCH in one subframe. That is, a time-frequency resource 851 (861) having two-symbol duration in an EPDCCH region is allocated to the non-legacy UE 2 and used for transmitting a UL grant. The remaining resources 852 (862) in the same EPDCCH region as the resource 851 (861) may be allocated to the same non-legacy UE 2 as the resource 851 (861) or may be allocated to another non-legacy UE 2.

Figure 9:
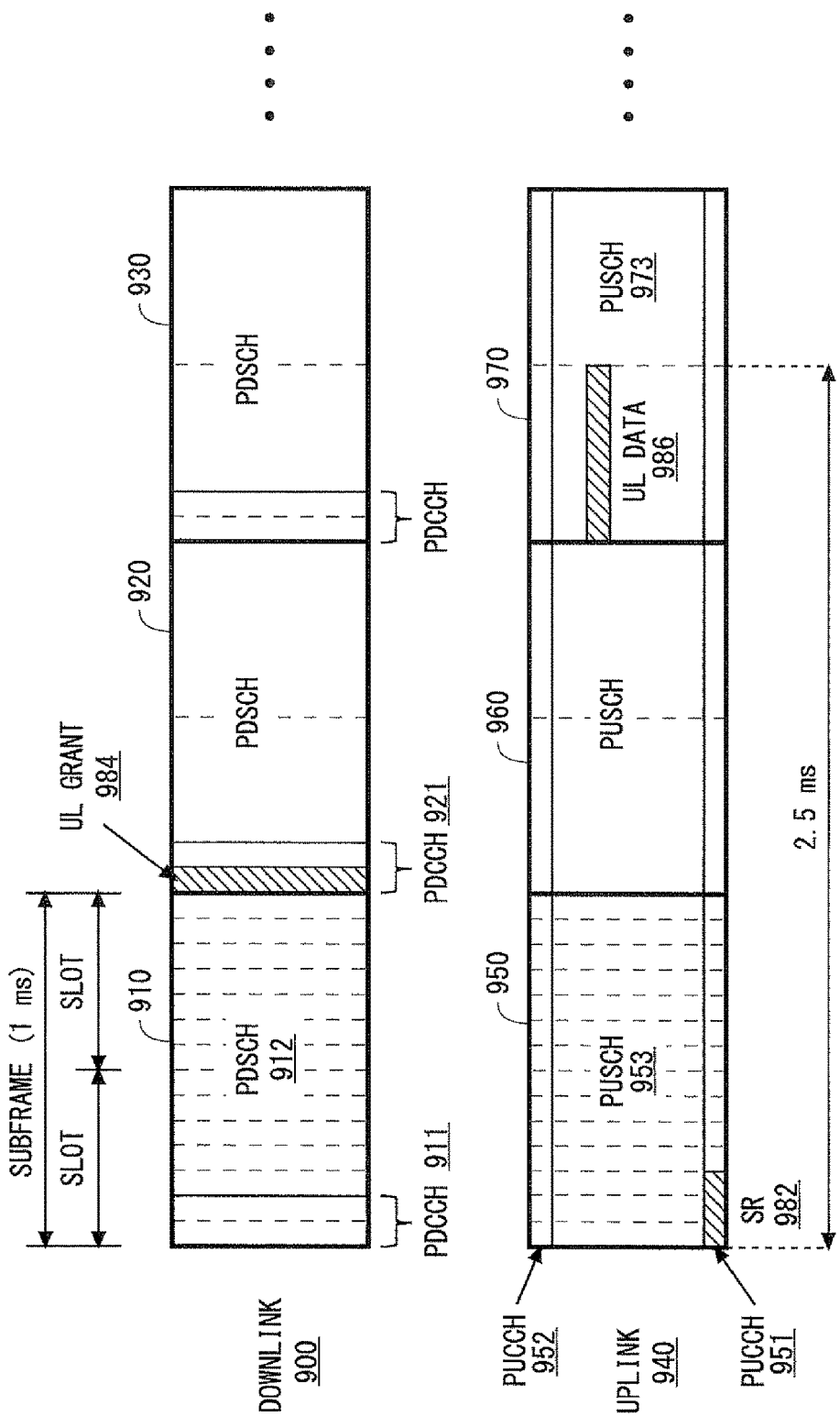
FIG. 9 is a diagram showing an example of UL data transmission by a non-legacy UE according to the first embodiment.

Next, some specific examples related to the UL data transmission via the second access by the non-legacy UE 2 will be described with reference to FIGS. 9 to 13. FIG. 9 shows a first example of the UL data transmission via the second access. In the example of FIG. 9, the radio frame structure of LTE and LTE-Advanced is used. Specifically, a DL radio frame 900 includes consecutive DL subframes 910, 920, and 930. A UL radio frame 940 includes consecutive UL subframes 950, 960, and 970. The duration of each of the UL subframes and DL subframes is 1 ms.

In the DL subframe 910, a PDCCH is mapped to a PDCCH resource 911, which is composed of two symbols positioned at the beginning of the DL subframe 910, and a PDSCH is mapped to a PDSCH region 912. Resource mapping in the DL subframes 920 and 930 is performed in a manner similar to that in the DL subframe 910. On the other hand, in the UL subframe 950, a PUCCH is mapped to PUCCH regions 951 and 952 at both ends of the UL system bandwidth, and a PUSCH is mapped to a PUSCH region 953. Resource mapping in the UL subframes 960 and 970 is performed in a manner similar to that in the UL subframe 950.

In the example of FIG. 9, the non-legacy UE 2 transmits an SR 982 using a few symbols (e.g., three symbols) positioned at the beginning of the PUCCH region 951 of the UL subframe 950. Alternatively, as in the case of existing SR transmission using a PUCCH region, the SR 982 may be transmitted using resources of both the PUSCH regions 951 and 952 at the both ends. In response to receiving the SR 982, the BS 3 determines assignment of UL resources to the non-legacy UE 2 and transmits a UL scheduling grant (UL grant) 984 in a PDCCH region 921 of the DL subframe 920. The UL grant 984 indicates assignment of time-frequency resources (in this case, resource blocks) in the next UL subframe 970. In response to receiving the UL grant 984, the non-legacy UE 2 transmits UL data 986 using the assigned resource blocks in a PUSCH region 973 of the UL subframe 970. Therefore, in the example in FIG. 9, the required time (access latency) from the transmission of the SR to the completion of the UL data transmission is about 2.5 ms. LTE specifies that, when a UE receives a UL grant on a PDCCH in the subframe #n, the UE should transmit user data in a PUSCH in the subframe #n+k. For FDD, k=4. For TDD, k takes a value from 4 to 7 depending on the TDD UL/DL configuration. The UL data transmission shown in the example of FIG. 9 is intended to reduce the value of k, specifically k=1 in the example of FIG. 7. When the value of k is newly defined, for FDD, it may be a fixed value associated with the value of the second TTI, or it may be set by RRC signaling or the like. For TDD, it may be a value uniquely determined by a combination of the value of the second TTI and the timing (subframe #) at which the UL grant is received, or it may be set by RRC signaling or the like.

Figure 10:
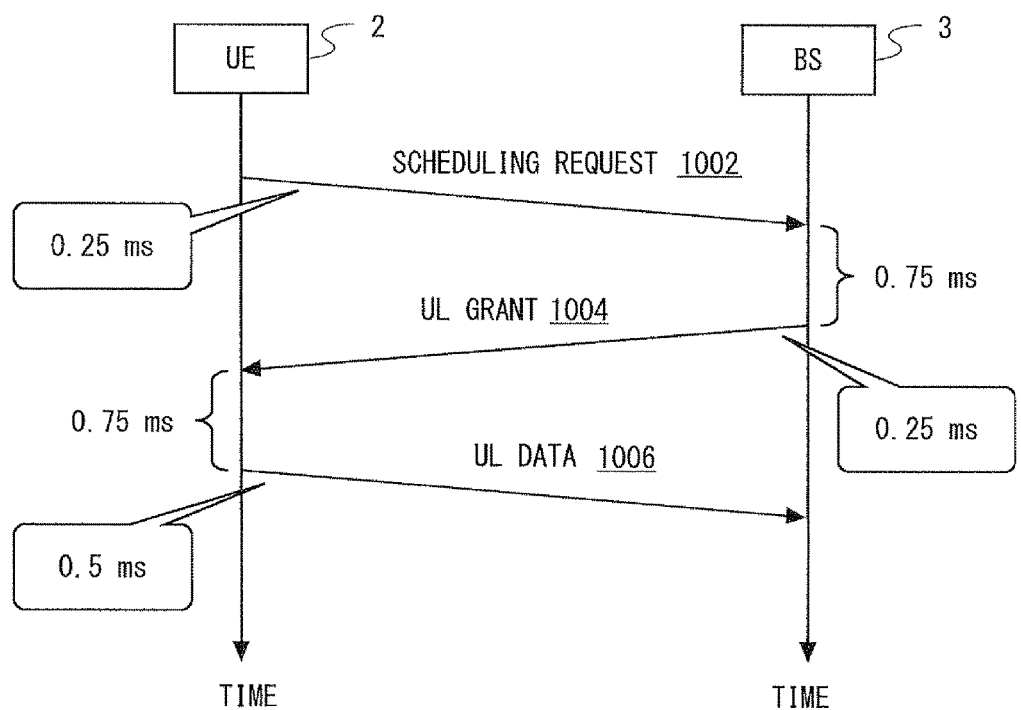
FIG. 10 is a diagram showing an example of a UL data transmission sequence of a non-legacy UE according to the first embodiment.

FIG. 10 shows an example of transmission timings according to the example of FIG. 9. A scheduling request 1002 corresponds to the SR 982 in FIG. 9, a UL grant 1004 corresponds to the UL grant 984 in FIG. 9, and UL Data 1006 corresponds to the UL Data 986 in FIG. 9. The transmission of the SR 1002 (982) requires about 0.25 ms. The BS 3 transmits the UL grant 1004 (984) at the beginning of the next DL subframe (920), which starts about 0.75 ms after receiving the SR 1002 (982). The transmission of the UL grant 1004 (984) requires about 0.25 ms. The UE 2 transmits the UL data 1006 (986) in the UL subframe (970), which starts about 0.75 ms after receiving the UL grant 1004 (984). Therefore, the required time (access latency) from the transmission of the SR 1002 (982) to the completion of transmitting the UL data 1006 (986) is about 2.5 ms.

Figure 11:
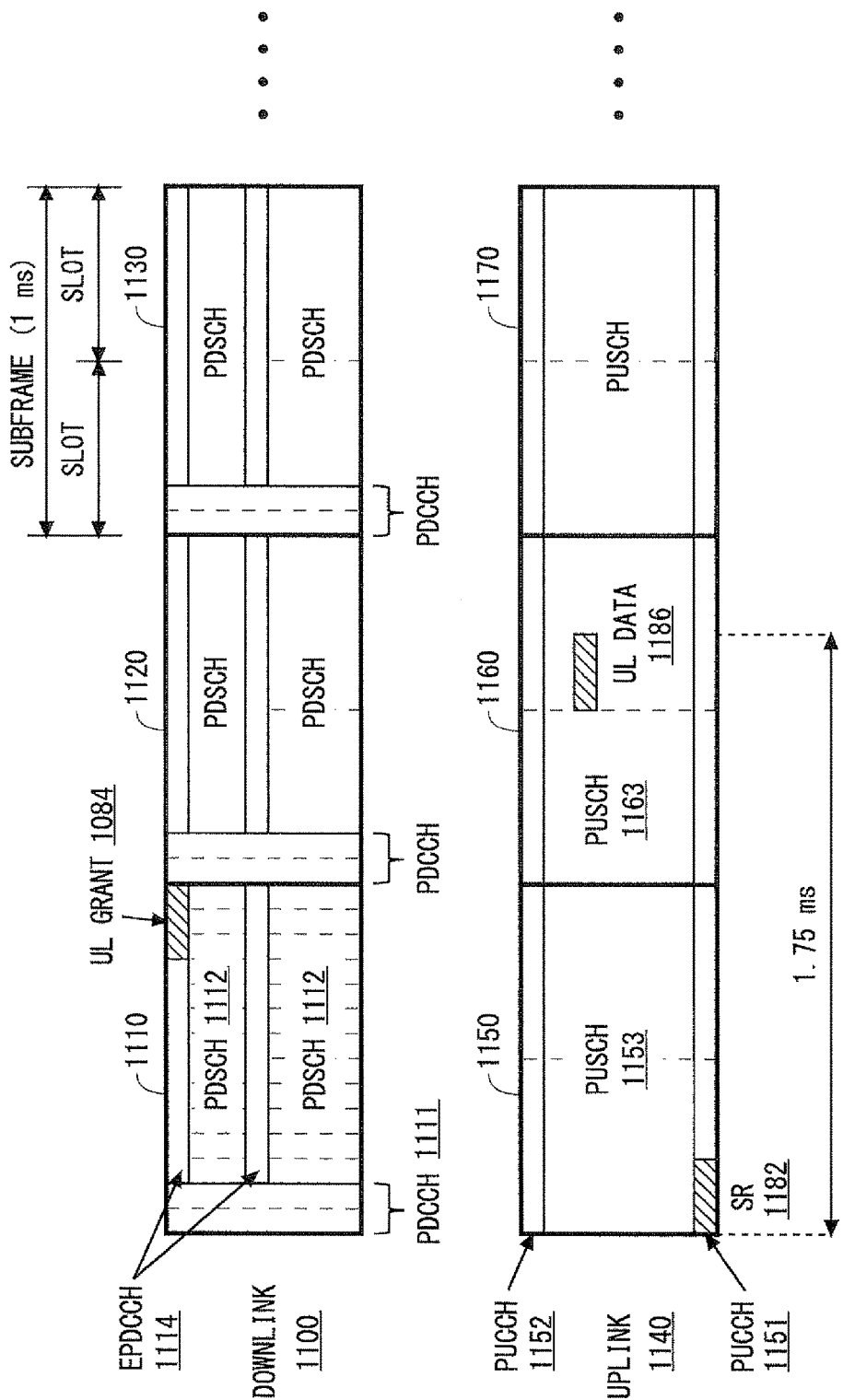
FIG. 11 is a diagram showing an example of a UL data transmission sequence of a non-legacy UE according to the first embodiment.

FIG. 11 shows a second example of the UL data transmission via the second access. In the example of FIG. 11, the radio frame structure of LTE and LTE-Advanced is used. Specifically, a DL radio frame 1100 includes consecutive DL subframes 1110, 1120, and 1130. A UL radio frame 1140 includes consecutive UL subframes 1150, 1160, and 1170. The duration of each of the UL subframes and DL subframes is 1 ms.

In the DL subframe 1110, a PDCCH is mapped to a PDCCH resource 1111, which is composed of two symbols positioned at the beginning of the DL subframe 1110. The DL subframe 1110 further includes an EPDCCH region 1114. PDSCH is mapped to a PDSCH region 1112. Resource mapping in the DL subframes 1120 and 1130 is performed in a manner similar to that in the DL subframe 1110. On the other hand, in the UL subframe 1150, a PUCCH is mapped to PUCCH regions 1151 and 1152 at both ends of the UL system bandwidth, and a PUSCH is mapped to a PUSCH region 1153. Resource mapping in the UL subframes 1160 and 1170 is performed in a manner similar to that in the UL subframe 1150.

In the example of FIG. 11, the non-legacy UE 2 transmits an SR 1182 using a few symbols (e.g., three symbols) positioned at the beginning of a PUCCH region 1151 of the UL subframe 1150. Alternatively, as in the case of existing SR transmission using a PUCCH region, the SR 1182 may be transmitted using resources of both the PUSCH regions 1151 and 1152 at the both ends. In response to receiving the SR 1182, the BS 3 determines assignment of UL resources to the non-legacy UE 2 and transmits a UL grant 1184 in the EPDCCH region 1114 of the DL subframe 1110. The UL grant 1184 indicates assignment of time-frequency resources in the next UL subframe 1160. In response to receiving the UL grant 1184, the non-legacy UE 2 transmits UL data 1186 using the assigned time-frequency resources in a PDSCH region 1163 of the UL subframe 1160. Therefore, in the example shown in FIG. 11, the required time (access latency) from the transmission of the SR to the completion of the UL data transmission is about 1.75 ms.

Figure 12:
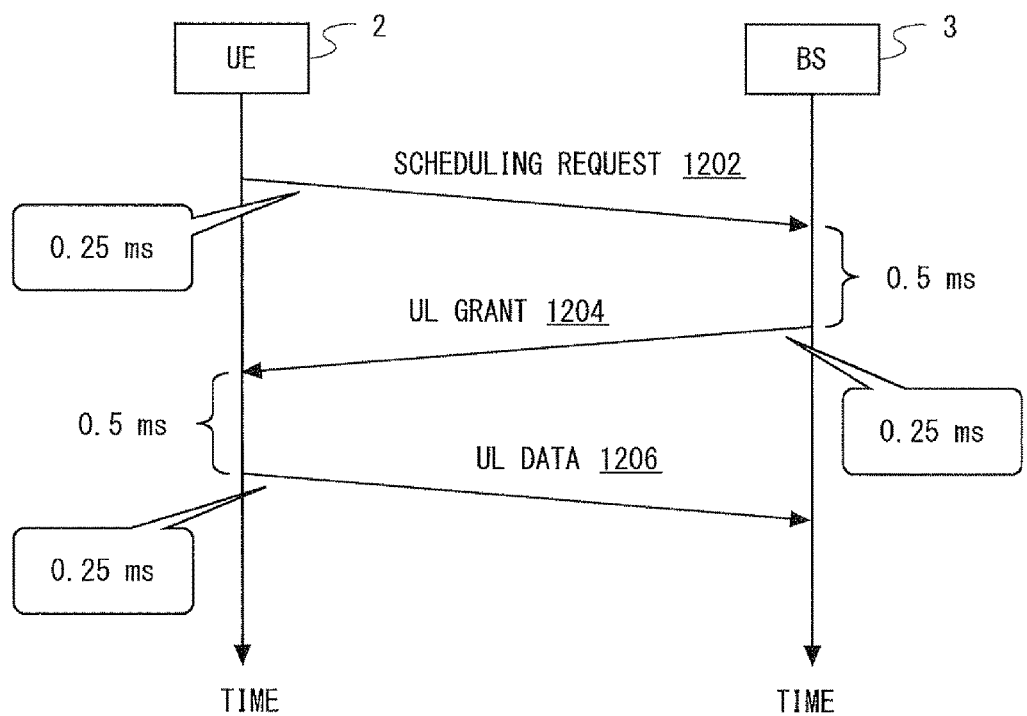
FIG. 12 is a diagram showing an example of a UL data transmission sequence of a non-legacy UE according to the first embodiment.

FIG. 12 shows an example of transmission timings according to the example of FIG. 11. A scheduling resource request 1202 corresponds to the SR 1182 in FIG. 11, a UL grant 1204 corresponds to the UL grant 1184 in FIG. 11, and UL data 1206 corresponds to the UL data 1186 in FIG. 11. The transmission of the SR 1202 (1182) requires about 0.25 ms. The BS 3 transmits the UL grant 1204 (1184) in the second slot of the DL subframe (1120) about 0.5 ms after receiving the SR 1202 (1182). The transmission of the UL grant 1204 (1184) requires about 0.25 ms. The UE 2 transmits UL data 1206 (1186) on the second slot of the UL subframe (1170), which starts about 0.5 ms after receiving the UL grant 1204 (1184). Therefore, the required time (access latency) from the transmission of the SR 1202 (1182) to the completion of transmitting the UL data 1206 (1186) is about 1.75 ms.

Figure 13:
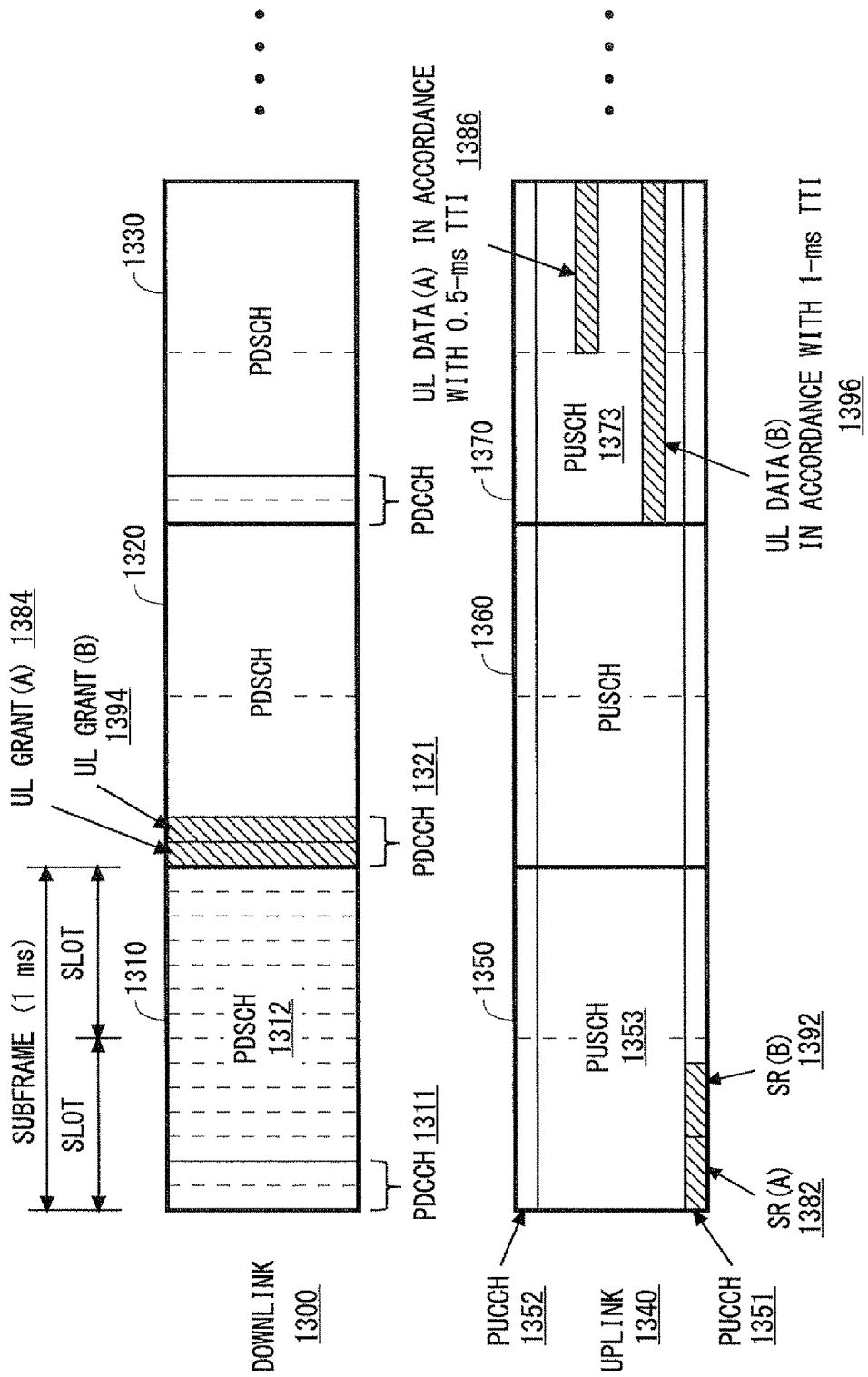
FIG. 13 is a diagram showing an example of a UL data transmission sequence of a non-legacy UE according to the first embodiment.

FIG. 13 shows a third example of the UL data transmission via the second access. In the example of FIG. 13, the radio frame structure of LTE and LTE-Advanced is used. Specifically, a DL radio frame 1300 includes consecutive DL subframes 1310, 1320, and 1330. A UL radio frame 1340 includes consecutive UL subframes 1350, 1360, and 1370. The duration of each of the UL subframes and DL subframes is 1 ms.

In the DL subframe 1310, a PDCCH is mapped to a PDCCH resource 1311, which is composed of two symbols positioned at the beginning of the DL subframe 1310, and a PDSCH is mapped to a PDSCH region 1312. Resource mapping in the DL subframes 1320 and 1330 is performed in a manner similar to that in the DL subframe 1310. On the other hand, in the UL subframe 1350, a PUCCH is mapped to PUCCH regions 1351 and 1352 at both ends of the UL system bandwidth, and a PUSCH is mapped to a PUSCH region 1353. Resource mapping in the UL subframes 1360 and 1370 is performed in a manner similar to that in the UL subframe 1350.

In the example of FIG. 13, two non-legacy UEs 2 (hereinafter referred to as UEs 2A and 2B) perform the second access in parallel. The non-legacy UE 2A transmits an SR 1382 using a few symbols (e.g., three symbols) positioned at the beginning of the PUCCH region 1351 of the UL subframe 1350. On the other hand, the non-legacy UE 2B transmits an SR 1392 using resources in the PUCCH region 1351 right after the SR 1382. Alternatively, the SR 1382 and SR 1392 may be multiplexed onto the same time-frequency resources using Code Division Multiplexing (CDM). Further alternatively, as in the case of existing SR transmission using a PUCCH region, the SR 1382 may be transmitted using resources of both the PUCCH regions 1351 and 1352 at the both ends.

In response to receiving the SR 1382 from the UE 2A, the BS 3 determines assignment of UL resources to the non-legacy UE 2 A and transmits a UL grant 1384 in a PDCCH region 1321 of the DL subframe 1320. Similarly, in response to receiving the SR 1392 from the UE 2B, the BS 3 determines assignment of UL resources to the non-legacy UE 2B and transmits a UL grant 1394 in the PDCCH region 1321. In the example of FIG. 13, the UL grant 1384 is transmitted using the first symbol in the PDCCH region 1321, and the UL grant 1394 is transmitted using the second symbol in the PDCCH region 1321.

In response to receiving the UL grant 1384, the non-legacy UE 2A transmits UL data 1386 using the assigned resource blocks in a PDSCH region 1373 of the UL subframe 1370. The UL data 1386 is transmitted in accordance with the second TTI (0.5 ms) that is equal to half of the subframe duration (1 ms).

Similarly, in response to receiving the UL grant 1394, the non-legacy UE 2B transmits UL data 1396 using the assigned resource blocks in the PUSCH region 1373 of the UL subframe 1370. In the example of FIG. 13, transmission of UL data by the UE 2B in the UL subframe 1370 is performed in accordance with the first TTI (1 ms) that is equal to the subframe duration (1 ms). However, UL data transmission by the UE 2B in the UL subframe 1370 may be performed in accordance with the second TTI (0.5 ms). In other words, transmission in accordance with the second TTI by the UE 2B may be performed twice consecutively in the UL subframe 1370. In this case, the UL grant may include scheduling information based on the second TTI and information (e.g., flag) indicating that this scheduling information is valid for two TTIs (1.0 ms).

Second Embodiment

This embodiment provides a modified example of the UL data transmission via the second access described in the first embodiment. A configuration example of a radio communication system according to this embodiment is the same as that shown in FIG. 1.

The relation between transmission of an SR (e.g., PUCCH) by the non-legacy UE 2 and UL data transmission (e.g., PUSCH) based on this SR may be similar to that in the existing LTE and LTE-Advanced. That is, the BS 3 transmits a UL grant in response to an SR from the non-legacy UE 2 and the non-legacy UE 2 transmits UL data on UL radio resources specified by this UL grant. When there is (remaining) data that cannot be transmitted by the UL radio resources specified by the UL grant in the buffer, the non-legacy UE 2 transmits a Buffer Status Report (BSR), in addition to data, on the UL radio resources. In response to the BSR, the BS 3 transmits to the non-legacy UE 2 a UL grant indicating further assignment of UL radio resources.

However, some latency occurs when the non-legacy UE 2 transmits a BSR and waits for an additional UL grant. In order to avoid this latency, the relation between the SR and the UL grant may be previously specified. For example, the non-legacy UE 2 and the BS 3 may operate as follows.

Figure 14:
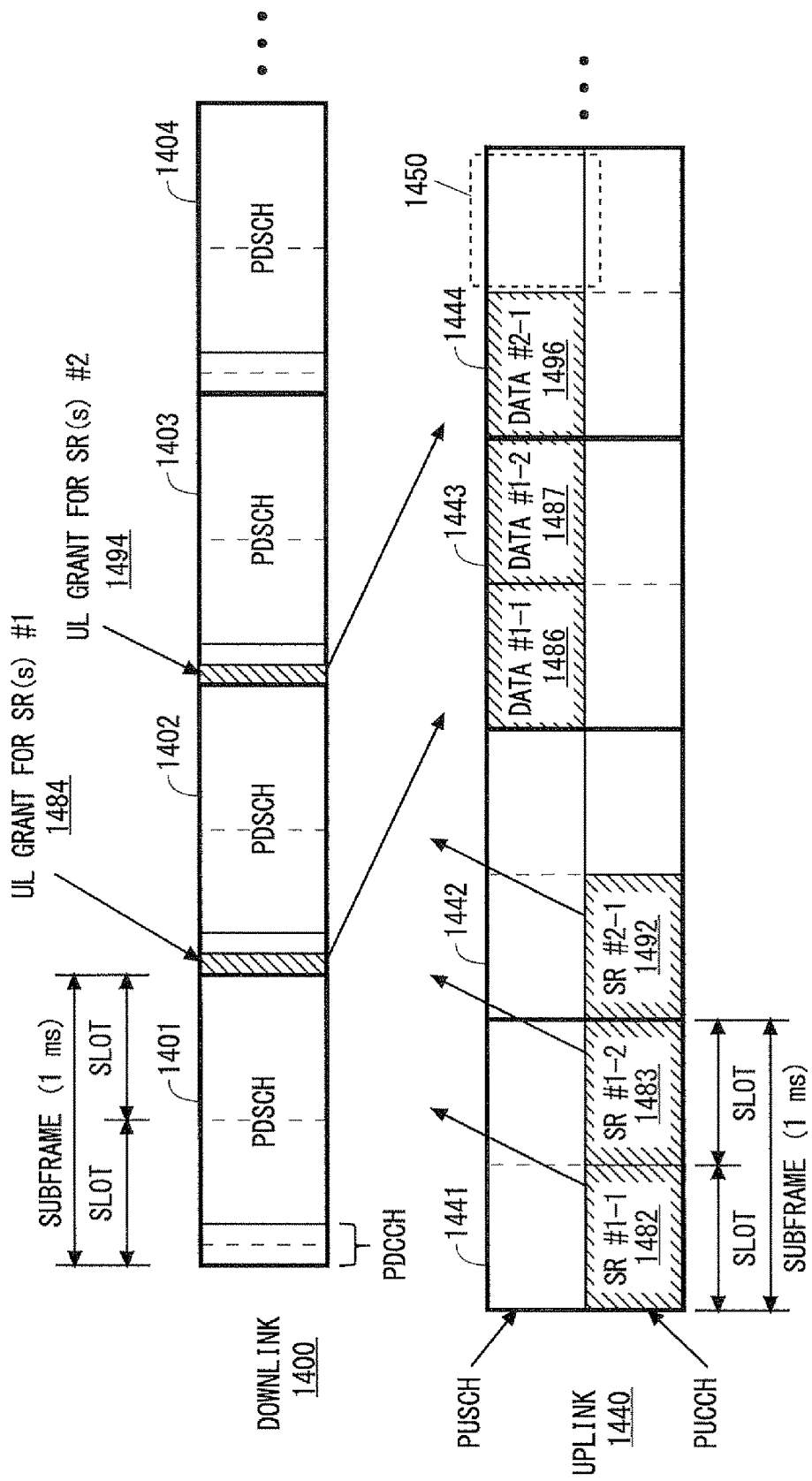
FIG. 14 is a diagram showing an example of a UL data transmission sequence of a non-legacy UE according to a second embodiment.

An example of the operation of the non-legacy UE 2 and the BS 3 will be described with reference to FIG. 14. In FIG. 14, a DL radio frame 1400 includes consecutive subframes 1401, 1402, 1403, and 1404. A UL radio frame 1440 includes consecutive UL subframes 1441, 1442, 1443, and 1444.

The BS 3 allocates, to one non-legacy UE 2, dedicated time-frequency resources to transmit two SRs in one subframe (1 ms). The duration of each of the two dedicated radio resources is equal to half of the subframe duration and is equal to the duration of one slot (i.e., 0.5 ms).

If there is UL data to be transmitted in the buffer, the non-legacy UE 2 firstly transmits an SR #1-1 (1482) on the first dedicated radio resource (the first slot of the UL subframe 1441).

If the non-legacy UE 2 determines that there is (possibly) data that cannot be transmitted in one data transmission (e.g., 0.5 ms), it transmits an SR #1-2 (1483) on the second dedicated radio resource (the second slot of the UL subframe 1441). In order to make this determination, for example, the minimum data size guaranteed by one data transmission (e.g., transport block size) may be set previously in the UE 2 or may be previously transmitted from the BS 3 to the UE 2. The non-legacy UE 2 may determine whether the transmission of the second SR is required based on this setting of the minimum data size.

When the BS 3 receives the SR #1-1 (1482), it transmits a UL grant #1 (1484) in the DL subframe 1402. On the other hand, the BS 3 does not transmit an explicit UL grant in response to the SR #1-2 (1483). However, when the BS 3 receives the SR #1-2 (1483) following the SR #1-1 (1482), it implicitly allows a transmission that uses a layer 1 format (e.g., Modulation and Coding Scheme (MCS) and resource blocks (subcarriers)) identical to that specified by the UL grant #1 (1484).

If the non-legacy UE 2 determines that there is (possibly) data that cannot be transmitted in the second data transmission (e.g., 0.5 ms), it transmits a further SR #2-1 (1492) on the third dedicated radio resource (the first slot of the UL subframe 1442). In this example, the non-legacy UE 2 does not transmit an SR #2-2 in the slot (the second slot of the UL subframe 1442) right after the SR #2-1 (1492). This is because, for example, there is no data to be transmitted anymore, i.e., all transmissions are expected to be completed by the UL grants in response to the SRs #1-1, #1-2, and #2-1.

The non-legacy UE 2 transmits UL data #1-1 (1486) in the first slot of the UL subframe 1443 using the UL radio resources specified in the UL grant #1 (1484). If the non-legacy UE 2 determines that there is (possibly) data that cannot be transmitted even in this data transmission and subsequent data transmission based on a UL grant #2, which will be described later, it may transmit a BSR in this data transmission.

If the second SR #1-2 (1483) has already been transmitted and there is remaining data in the buffer, the non-legacy UE 2 transmits UL data #1-2 (1487), using the same layer 1 format (e.g., MCS and resource blocks (subcarriers)) as the UL data #1-1 (1486), in a slot right after the slot in which the UL data #1-1 (1486) is transmitted.

When the BS 3 receives the SR #2-1 (1492), it transmits a UL grant #2 (1494) in the DL subframe 1403. Since the BS 3 has not received the fourth SR #2-2, no implicit grant for transmission is performed.

The non-legacy UE 2 transmits UL data #2-1 (1496) in the first slot of the UL subframe 1444 using the UL radio resources specified by the UL grant #2 (1494). As the non-legacy UE 2 has not transmitted the SR #2-2, it does not perform transmission in a radio resource 1450 of the slot right after transmitting the UL data #2-1 (1496).

If BS 3 has not received the second SR #2-2 from the non-legacy UE 2, it may allocate the radio resource 1450 after the UL data #2-1 (1496) to another UE.

In this embodiment, it is possible to reduce radio resources required for transmitting UL grants.

Third Embodiment

This embodiment provides an example in which a non-legacy UE 2 determines whether to perform the second access. A configuration example of a radio communication system according to this embodiment is the same as that shown in FIG. 1.

The non-legacy UE 2 determines whether the condition under which the second access is allowed is satisfied, and performs data transmission or reception via the second access if the condition is satisfied. If the condition is not satisfied, the non-legacy UE 2 may transmit or receive data via the first access or may move to another cell (e.g., cell reselection) and attempt the second access.

In some implementations, the condition under which the second access is allowed may be set previously in the non-legacy UE 2. Alternatively, at least part of the condition may be sent to the non-legacy UE 2 from the BS 3.

In some implementations, when triggered by UL data transmission, the non-legacy UE 2 may determine whether the condition under which the second access is allowed is satisfied and perform this UL transmission in accordance with the second TTI if the condition is satisfied.

In some implementations, when triggered by reception of a DL message that requires a response, the non-legacy UE 2 may determine whether the condition under which the second access is allowed is satisfied and perform transmission to respond to this DL message in accordance with the second TTI if the condition is satisfied. The DL message requiring a response is, for example, a paging or a DL grant.

Figure 15:
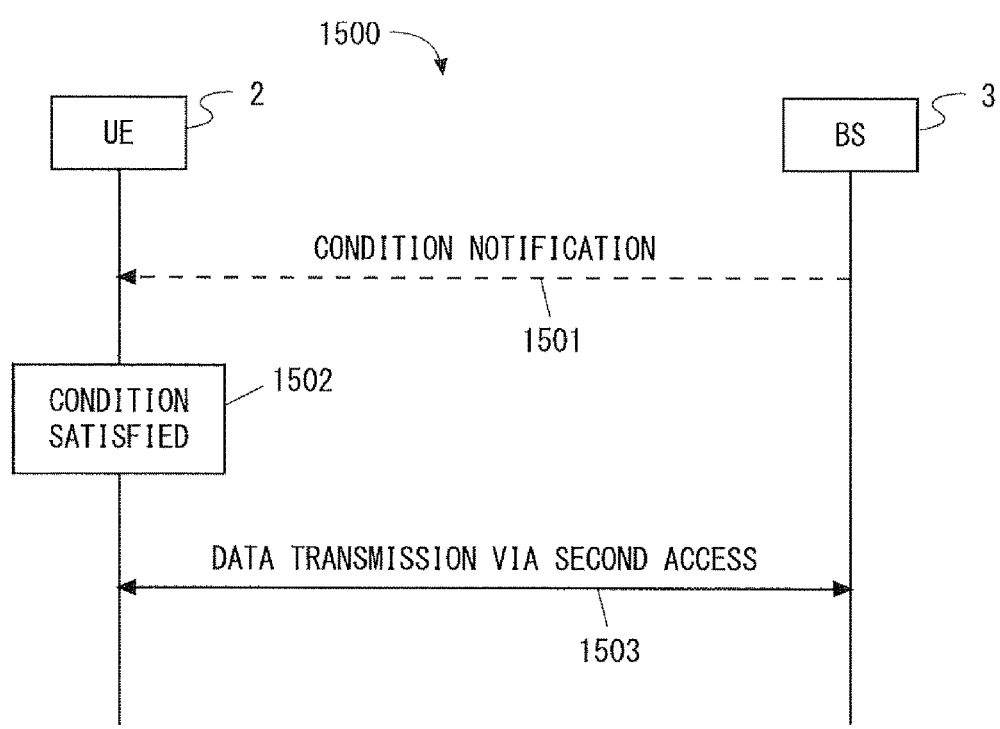
FIG. 15 is a diagram showing an example of a procedure for starting a second access according to a third embodiment.

FIG. 15 is a sequence diagram showing an example (process 1500) of a procedure for starting the second access. In block 1501, the BS 3 notifies the UE 2 of at least part of the condition for allowing the second access (condition notification). In block 1502, the non-legacy UE 2 determines whether the condition for allowing the second access is satisfied. If the condition is satisfied, the non-legacy UE 2 transmits or receives data via the second access (1503).

Figure 16:
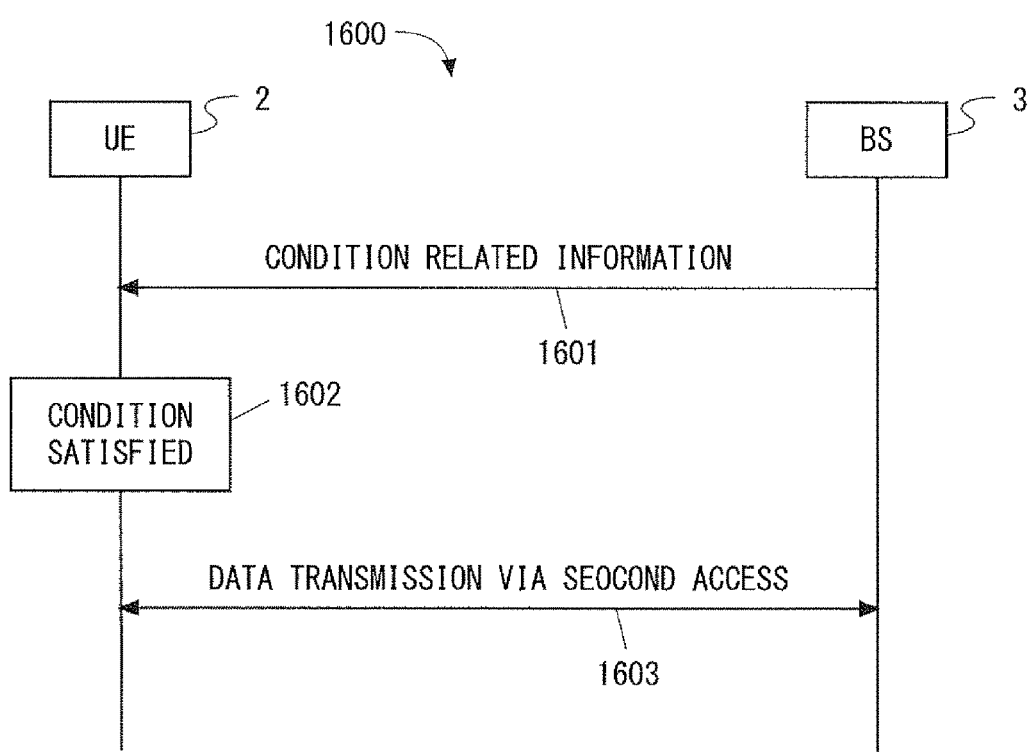
FIG. 16 is a diagram showing an example of a procedure for starting a second access according to the third embodiment.

FIG. 16 is a sequence diagram showing another example (process 1600) of the procedure for starting the second access. In block 1601, the BS 3 transmits, to the non-legacy UE 2, condition-related information that is related to the condition for allowing the second access. For example, the BS 3 may transmit, in an RRC message (e.g., RRC Connection Reconfiguration) or system information (e.g., System Information Block (SIB)), the information related to the condition for allowing the second access performed in the cell managed by the BS 3. The BS 3 may receive this information, which is related to the condition, from a higher network node (e.g., Mobility Management Entity (MME), Serving Gateway (S-GW), Packet Data Network Gateway (P-GW) or Application server) and forward it (transparently) to the UE 2.

In block 1602, the non-legacy UE 2 determines whether a condition defined based on the information received from the BS 3 is satisfied. If this condition is satisfied, the UE 2 transmits or receives data via the second access (1603).

In the determination by the non-legacy UE 2, the condition for allowing the second access may be, for example, any one or any combination of the following conditions 1 to 8.

Condition 1: Data Transmission Requires the Second Access

A higher layer (e.g., Non-Access Stratum (NAS) or an application layer) may notify the UE 2 whether data transmission requires the second access. The non-legacy UE 2 does not always require low latency. For example, if the non-legacy UE 2 is installed in a car, it can be assumed that the requirement for low latency is more stringent for the data transmission or reception in the event of an emergency during autonomous driving as compared to the case of normal data transmission or reception. That is, the second access may be allowed only if the non-legacy UE 2 executes a specific application or service.

Condition 2: The Second Access has been Previously Allowed (or Authorization for the Second Access is Given) to the Non-Legacy UE 2

The higher layer (e.g., NAS or application layer) may notify the UE 2 whether the second access has been previously allowed. The Access Stratum (AS) layer of the non-legacy UE 2 may perform the second access when it is notified (or has been previously notified) by the higher layer that the second access has been allowed (or authorization for the second access is given). The higher layer may recognize that the second access has been previously granted, for example, when it is notified of the allowance (or authorization) of the second access by a radio network (e.g., MME, Home Subscriber Server (HSS), or application server). Alternatively, to recognize that the second access has been previously allowed, the higher layer may determine whether the intended application or service has been previously allowed (or authorized) to perform the second access in a contract operator or a connected radio network (e.g., registered Public Land Mobile Network (PLMN)).

Condition 3: The Second Access is Allowed (or can be Performed) in a Serving Cell to which the Non-Legacy UE 2 is Connected The non-legacy UE 2 receives broadcast information (SIB) or dedicated control information (RRC Signaling such as RRC Connection Reconfiguration) and determines whether the second access is allowed (or can be performed). The serving cell may be an SCell of Carrier Aggregation or may be a PSCell or an SCell of Dual Connectivity.

Condition 4: The Second Access Corresponds to a Type that is Allowed in a Serving Cell to which the Non-Legacy UE 2 is Connected The non-legacy UE 2 receives broadcast information or dedicated control information and determines whether the intended application or service corresponds to a type (access type), a purpose (access cause), or a usage (use case) that is allowed in the serving cell. The serving cell may be an SCell of Carrier Aggregation or may be a PSCell or an SCell of Dual Connectivity.

Condition 5: The Non-Legacy UE 2 has Configuration Information Regarding the Second Access The non-legacy UE 2 may determine that the second access is allowed when it has: (a) configuration information for an dedicated scheduling request for the second access (D-SR configuration (D-SR2)); (b) supplemental information about radio resources for data transmission via the second access (e.g., truncated MCS set, candidate PRB set, candidate TTI length set, or maximum transport block (TB) size); or (c) radio resource configuration information for the second access (e.g., MCS, PRB, TTI length).

Condition 6: The Second Access is Preferable to the First Access

For example, the non-legacy UE 2 may perform the first access if radio resources have already been allocated, otherwise it may perform the second access. Alternatively, the non-legacy UE 2 may perform the first access if it has already transmitted a conventional D-SR, otherwise it may perform the second access.

Condition 7: Data Transmission Via the Second Access can be Performed (Completed)

For example, the non-legacy UE 2 may perform the second access if a radio quality is equal to or greater than a threshold quality level for the second access; otherwise it may perform the first access. Alternatively, the non-legacy UE 2 may perform the second access if the TB size is equal to or less than a threshold size that can be transmitted via the second access; otherwise it may perform the first access.

Condition 8: A Signal (DL Signal) that should be Responded to Via the Second Access is Received For example, the non-legacy UE 2 may perform the second access if it receives a paging or a DL grant that corresponds to (or requests) the second access.

Alternatively or in combination with the above conditions, the non-legacy UE 2 may apply the second access only to the Radio Link Control (RLC) Unacknowledged Mode (UM). Further, the non-legacy UE 2 may disable (not apply) segmentation and re-segmentation in the second access.

As understood from the above description, in this embodiment, the non-legacy UE 2 determines whether the second access is allowed, and performs the second access only if the second access is allowed. Thus, the non-legacy UE 2 can be controlled to perform the second access, for example, only in situations where the second access is suitable. Accordingly, it is possible to efficiently accommodate the non-legacy UE 2 performing the second access and the legacy UE 1 not performing the second access in the radio communication system.

Fourth Embodiment

This embodiment provides an example in which a BS 3 determines whether to perform the second access. A configuration example of a radio communication system according to this embodiment is the same as that shown in FIG. 1.

The BS 3 determines whether the non-legacy UE 2 satisfies a condition under which the second access is allowed, and it determines to allow (or cause) the UE 2 to perform the second access if the condition is satisfied.

Figure 17:
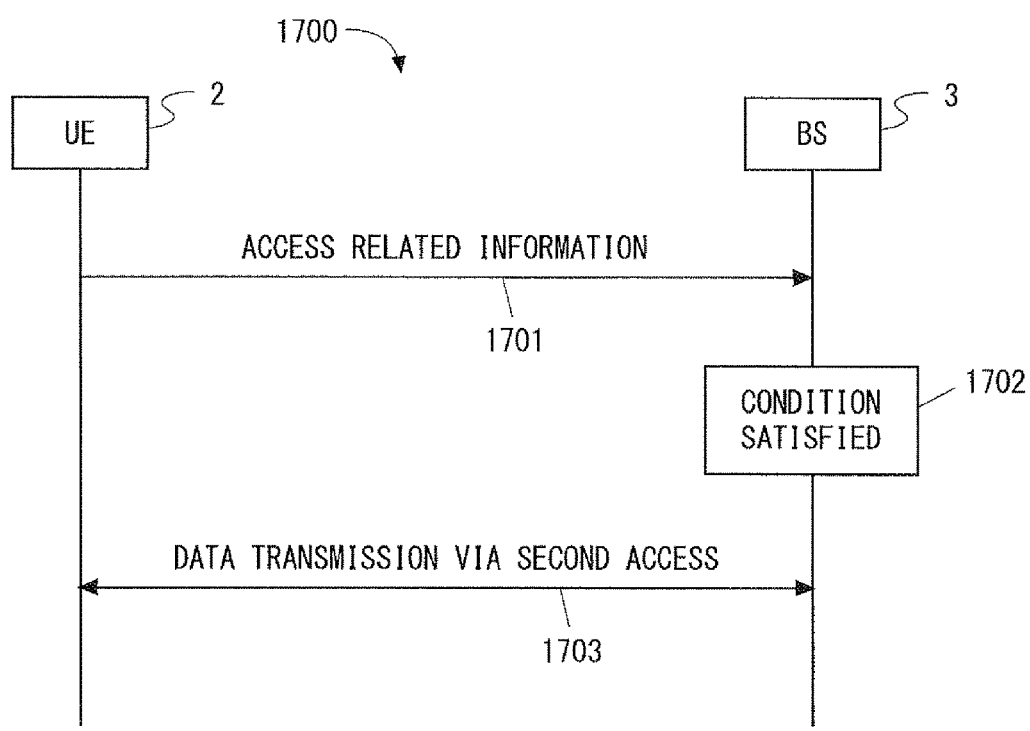
FIG. 17 is a diagram showing an example of a procedure for starting a second access according to a fourth embodiment.

FIG. 17 is a sequence diagram showing an example (process 1700) of a procedure for starting the second access. In block 1701, the non-legacy UE 2 transmits Access Related Information to the BS 3. The non-legacy UE 2 may transmit the Access Related Information in a radio connection establishment complete message (i.e., RRC Connection Setup Complete), a radio connection configuration complete message (i.e., RRC Connection Reconfiguration Complete), or other RRC messages.

In block 1702, the BS 3 determines whether the non-legacy UE 2 satisfies the condition for allowing the second access. If the condition is satisfied, the BS 3 performs the second access with the UE 2 (1703). If the UE 2 does not satisfy the condition, the BS 3 may cause the UE 2 to transmit or receive data via the first access, or cause the UE 2 to move another cell (e.g., handover, redirection to other frequency cell). The UE 2 may attempt the second access in the other cell.

Figure 18:
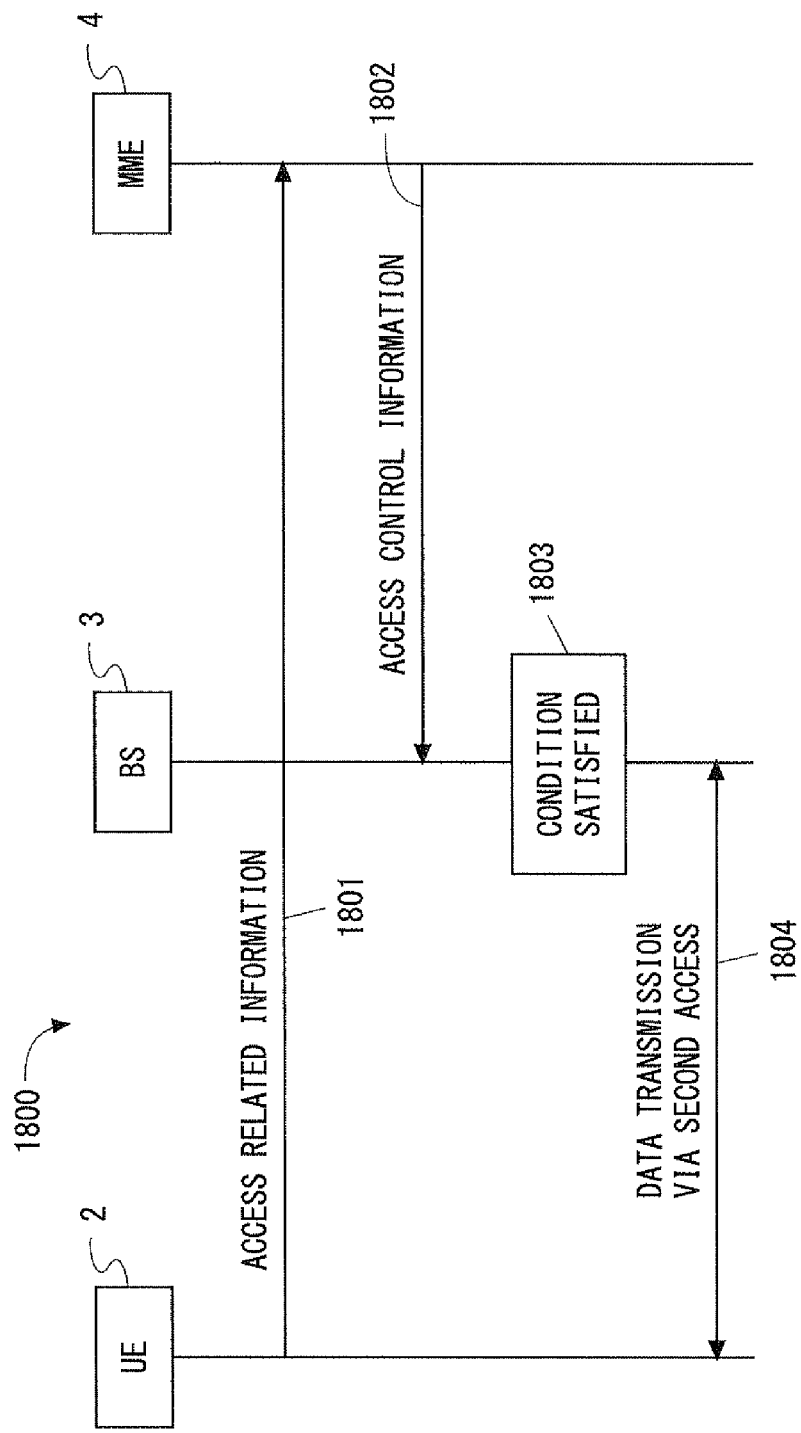
FIG. 18 is a diagram showing an example of a procedure for starting a second access according to the fourth embodiment.

FIG. 18 is a sequence diagram showing an example (process 1800) of a procedure for starting the second access. In block 1801, the non-legacy UE 2 transmits Access Related Information to an MME 4. For example, the UE 2 may transmit, to the BS 3, the Access Related information as NAS-layer information, and then the BS 3 may transfer the information to the MME 4 in an Initial UE Message.

In block 1802, the MME 4 transmits, to the BS 3, access control information that contains at least a part of the Access Related Information or contains access authorization information regarding the second access. The MME 4 may transmit the access control information using an Initial Context Setup Request.

In block 1803, the BS 3 determines whether the non-legacy UE 2 satisfies the condition for allowing the second access. If the condition is satisfied, the BS 3 performs the second access with the UE 2 (1804). If the UE 2 does not satisfy the condition, the BS 3 may cause the UE 2 to transmit or receive data via the first access, or cause the UE 2 to move another cell (e.g., handover, redirection to other frequency cell). The UE 2 may attempt the second access in the other cell.

The Access Related Information regarding the second access may be any one or any combination of the following (1) to (3).

(1) Radio Terminal Capability Information (UE Radio Access Capability (e.g., UE-EUTRA-Capability))

Information indicating that the UE has the function (capability) of transmitting or receiving data via the second access may be newly added to the existing radio terminal capability information. For example, a value of "low latency access", "lower latency access", "short TTI", "TTI shortening", "critical access", or "mission critical access" may be set in "supported" of the UE radio terminal access capability.

(2) Access Purpose (Access Cause, e.g., Establishment-Cause)

Information indicating that data transmission or reception via the second access is to be performed may be newly added to the existing access purpose. For example, a value such as "low latency access", "lower latency access", "short TTI access", "TTI shortening access", "critical access", or "mission critical access" may be added to the Access cause.

(3) Information Regarding Intended (Desired) Application or Service

This information may indicate what kind of application or service is intended (desired) to be performed. The non-legacy UE 2 may select and report an intended (desired) type(s) from among the previously configured application/service types (e.g., categories).

The access control information transmitted from the MME 4 to the BS 3 may be any one or any combination of the following (1) to (3).

(1) Part or all of the Access Related Information (2) Information Indicating Whether to Allow the Second Access to UE 2

The MME 4 may determine whether to allow the second access to the UE 2 and transmit a result of the determination to the BS 3.

(3) Information Indicating Whether the Second Access has been Allowed (by the Higher Network) to the UE 2

The MME 4 may inquire another network node (e.g., HSS or application server) whether the second access has been allowed to the UE 2 and transmit a result of the inquiry to the BS 3.

In the determination by the BS, the condition for allowing the second access may be any one or any combination of the following conditions 1 to 6.

Condition 1: Data Transmission Requires the Second Access

The BS 3 may determine whether data transmission requires the second access based on the Access Related Information received from the non-legacy UE 2. Alternatively, the BS 3 may determine whether data transmission requires the second access based on the access control information received from the higher network node (e.g., MME or application server).

Condition 2: The Second Access has been Previously Allowed (or Authorization for the Second Access is Given) to the Non-Legacy UE 2

The higher network node (e.g., MME or application server) may notify the BS 3 whether the second access has been previously allowed. The higher network node may recognize that the second access has been previously allowed when it is notified of the allowance (or authorization) of the second access by another network node (e.g., HSS or application server). Alternatively, to recognize that the second access has been previously allowed, the higher network node may determine whether the intended application or service is allowed (or authorized) to perform the second access in a contract operator or a connected radio network (e.g., registered PLMN).

Condition 3: The Second Access is Allowed (or can be Performed) in a Serving Cell to which the Non-Legacy UE 2 is Connected.

Condition 4: The Second Access Corresponds to a Type that is Allowed in a Serving Cell to which the Non-Legacy UE 2 is Connected Condition 5: Data Transmission Via the Second Access is can be Performed (Completed)

For example, the BS 3 may perform the second access if a radio quality is equal to or greater than a threshold quality level for the second access; otherwise it may perform the first access. Alternatively, the BS 3 may perform the second access if the TB size is equal to or less than a threshold size that can be transmitted via the second access; otherwise it may perform the first access.

Condition 6: A Signal that should be Responded to Via the Second Access is Received For example, when the non-legacy UE 2 desires data transmission responding to a paging that corresponds to (or requests) the second access, the BS 3 may allow the second access to the non-legacy UE 2.

Instead of or in combination with the above conditions, the BS 3 may apply the second access only to the RLC UM. Further, the BS 3 may disable (not apply) segmentation and re-segmentation in the second access.

As understood from the above description, in this embodiment, the BS 3 determines whether to allow the second access. Thus, for example, the BS 3 can control the non-legacy UE 2 to perform the second access, for example, only in situations where the second access is suitable. Therefore, it is possible to efficiently accommodate the non-legacy UE 2 performing the second access and the legacy UE 1 not performing the second access in the radio communication system.

Fifth Embodiment

This embodiment provides a modified example of the UL transmission via the second access described in the above embodiments. A configuration example of a radio communication system according to this embodiment is the same as that shown in FIG. 1.

In LTE-Advanced (3GPP Release 12), a Device-to-Device communication (or D2D communication, Direct communication) function for direct communication between UEs using an existing uplink frequency is defined. Further defined is a function of Direct discovery (D2D Discovery, Device discovery) in which a UE detects, as necessary, a UE or UEs which will be correspondents of the direct communication. These functions are sometimes collectively referred to as Proximity based Service (ProSe).

A direct interface between UEs for Direct communication and Direct discovery is referred to as a sidelink (SL) or a PC5 interface. As mentioned above, the sidelink uses the uplink frequency. Therefore, to perform ProSe, i.e., to perform the sidelink communication (at least one of Direct discovery and Direct communication), a UE needs to obtain information regarding radio resources used in the sidelink that corresponds to a part of the uplink radio resources in existing LTE.

In some implementations, a UE obtains SL control information in System information (e.g., SIB18 for Direct communication, SIB19 for Direct discovery). The System information includes information regarding common SL radio resources (Resource pool) that are commonly allocated to a plurality of UEs. A UE that has been allowed to perform ProSe selects radio resources from the common SL radio resources and performs the sidelink communication (i.e., at least one of Direct discovery and Direct communication).

In some implementations, a UE obtains the SL control information by dedicated signaling (e.g., RRC, MAC). In the dedicated signaling, common SL radio resources or dedicated SL radio resources (Dedicated resources) allocated in a dedicated manner (e.g., to each group) are transmitted from the eNB to the UE. When the UE receives the common SL radio resources by the dedicated signaling, the UE overwrites the information of the common SL radio resources transmitted by the System information. On the other hand, when the UE receives the dedicated SL radio resources by the dedicated signaling, the UE performs the sidelink communication using the dedicated SL radio resources. The information indicating the dedicated SL radio resources for Direct communication is also referred to as a sidelink grant (SL grant).

The scheme using the common SL radio resources is referred to as (UE) autonomous resource selection scheme, and the scheme using the dedicated SL radio resources is referred to as Scheduled resource allocation (by eNB) scheme.

The method and procedure for obtaining the SL control information for Direct discovery may differ from or be the same as the method and procedure for obtaining the SL control information for Direct communication.

Figure 19:
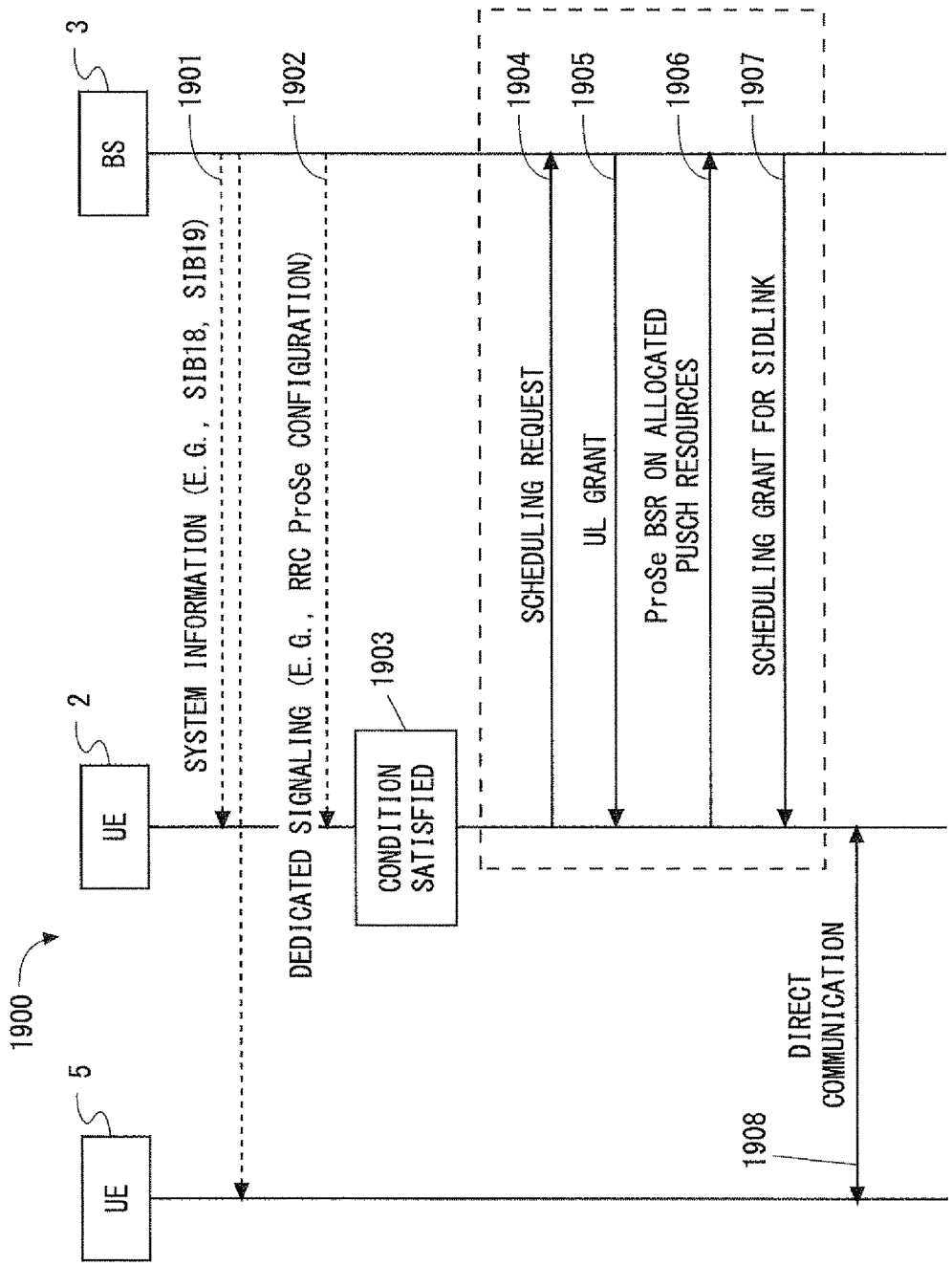
FIG. 19 is a diagram showing a communication procedure according to a fifth embodiment.

FIG. 19 is a diagram showing an example (process 1900) of a communication procedure according to this embodiment. The non-legacy UE 2 receives ProSe configuration from the BS 3 by SIB (1901) or dedicated signaling (1902).

When Direct communication is triggered and a predetermined condition is satisfied (block 1903), the non-legacy UE 2 transmits an SR to the BS 3 (1904). In block 1905, the non-legacy UE 2 receives a UL grant from the BS 3. In block 1906, the non-legacy UE 2 transmits a ProSe BSR using the allocated UL resources (PUSCH) to request allocation of resources for Direct communication. In block 1907, the non-legacy UE 2 receives from the BS 3 a scheduling grant (SL grant) indicating resource allocation for the sidelink communication (Direct communication). In block 1908, the UE 2 performs Direct communication with the UE 5 using the radio resources allocated from the BS 3.

At least a part of the transmission and reception in blocks 1904 to 1907 may be performed via the second access described in the above embodiments. For example, the UL data transmission in block 1906 may be performed via the second access in accordance with the second TTI. Further, the SR in block 1904 may be transmitted in a format or at a timing defined for the second access (i.e., low latency access).

If the condition for the second access is not satisfied in block 1903, transmission and reception in blocks 1904 to 1907 may be performed via the first access (existing access). Alternatively, if the condition for the second access is not satisfied in block 1903, the non-legacy UE 2 may not perform the processing in blocks 1904 to 1907 and instead perform Direct communication using radio resources selected from the resource pool.

Figure 20:
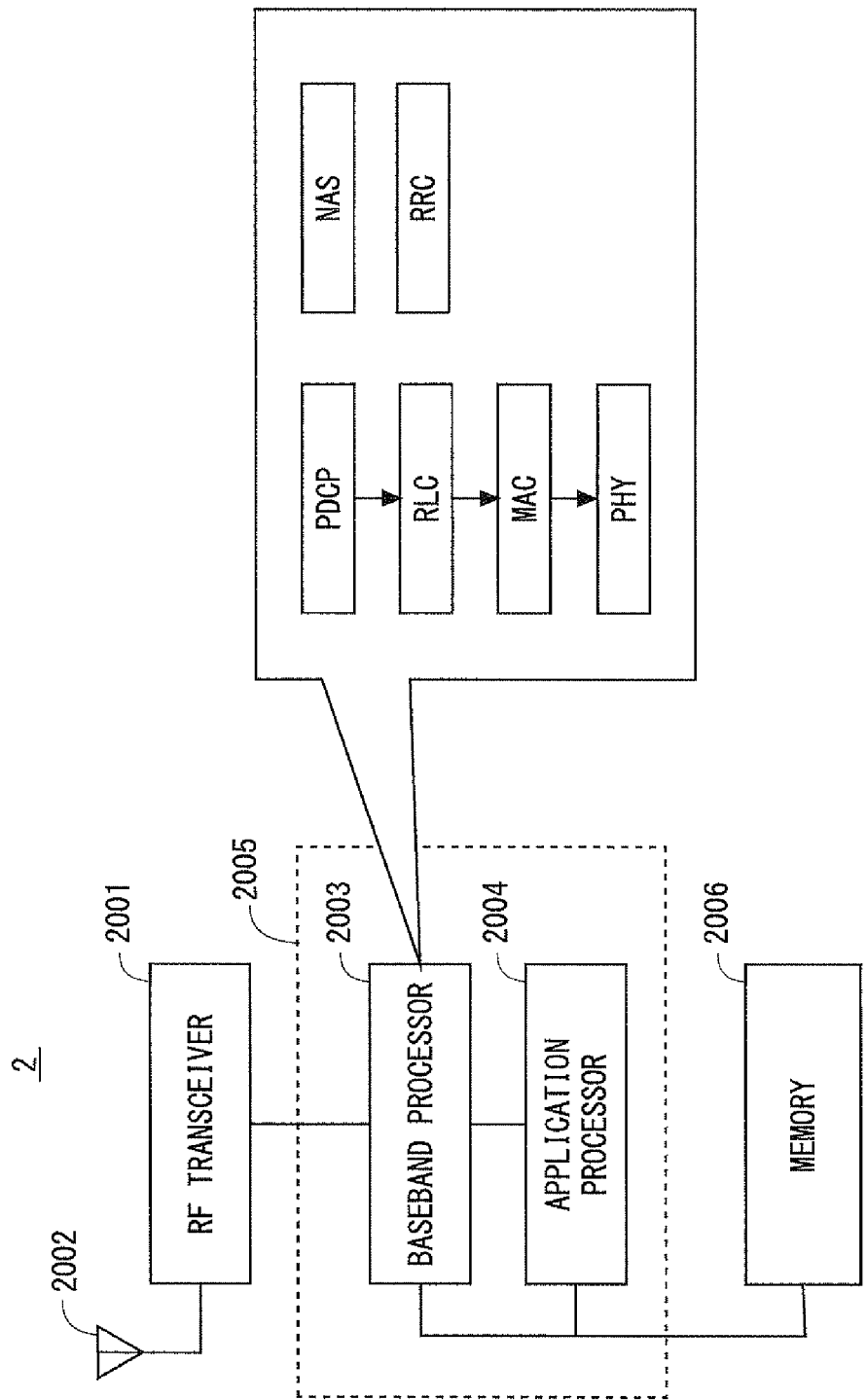
FIG. 20 is a block diagram showing a configuration example of a non-legacy UE according to some embodiments.

Lastly, configuration examples of the non-legacy UE 2 and BS 3 according to the aforementioned embodiments will be described. FIG. 20 is a block diagram showing a configuration example of the non-legacy UE 2. A Radio Frequency (RF) transceiver 2001 performs analog RF signal processing to communicate with the BS 3. The RF transceiver 2001 may also be used for the sidelink communication (i.e., Direct discovery and Direct communication) with other UEs. The RF transceiver 2001 may include a first transceiver used for communication with the BS 3 and a second transceiver used for sidelink communication with other UEs. The analog RF signal processing performed by the RF transceiver 2001 includes frequency up-conversion, frequency down-conversion, and amplification. The RF transceiver 2001 is coupled to an antenna 2002 and a baseband processor 2003. That is, the RF transceiver 2001 receives modulated symbol data (or OFDM symbol data) from the baseband processor 2003, generates a transmission RF signal, and supplies the transmission RF signal to the antenna 2002. Moreover, the RF transceiver 2001 generates a baseband reception signal based on a reception RF signal received by the antenna 2002, and supplies the baseband reception signal to the baseband processor 2003.

The baseband processor 2003 performs digital baseband signal processing (i.e., data plane processing) and control plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, (f) generation of OFDM symbol data (baseband OFDM signal) by Inverse Fast Fourier Transform (IFFT). On the other hand, the control plane processing includes communication management of layer 1 (e.g., transmission power control), layer 2 (e.g., radio resource management and hybrid automatic repeat request (HARQ) processing), and layer 3 (e.g., signaling relating to attach, mobility, and call management).

For example, in the case of LTE and LTE-Advanced, the digital baseband signal processing performed by the baseband processor 2003 may include signal processing of the Packet Data Convergence Protocol (PDCP) layer, the RLC layer, the MAC layer, and the PHY layer. Further, the control plane processing performed by the baseband processor 2003 may include processing of the NAS protocol and the RRC protocol.

The baseband processor 2003 may include a modem processor (e.g., Digital Signal Processor (DSP)) that performs the digital baseband signal processing and a protocol stack processor (e.g., Central Processing Unit (CPU) or Micro Processing Unit (MPU)) that performs the control plane processing. In this case, the protocol stack processor, which performs the control plane processing, may be integrated with an application processor 2004 described in the following.

The application processor 1904 is also referred to as a CPU, an MPU, a microprocessor, or a processor core. The application processor 2004 may include a plurality of processors (processor cores). The application processor 2004 loads a system software program (Operating System (OS)) and various application programs (e.g., a call application, a WEB browser, a mailer, a camera operation application, a music player application) from a memory 2006 or a memory (not shown) and executes these programs, thereby providing various functions of the non-legacy UE 2.

In some implementations, as represented by a dashed line (2005) in FIG. 20, the baseband processor 2003 and the application processor 2004 may be integrated on a single chip. In other words, the baseband processor 2003 and the application processor 2004 may be implemented in a single System on Chip (SoC) device 2005. A SoC device may also be referred to as a system Large Scale Integration (LSI) or a chipset.

The memory 2006 is a volatile memory or a non-volatile memory or a combination thereof. The memory 2006 may include a plurality of memory devices that are physically independent from each other. The volatile memory is, for example, a Static Random Access Memory (SRAM), a Dynamic RAM (DRAM) or a combination thereof. The non-volatile memory may be a Mask Read Only Memory (MROM), an Electrically Erasable Programmable ROM (EEPROM), a flash memory, a hard disk drive, or any combination thereof. For example, the memory 2006 may include an external memory device accessible from the baseband processor 2003, the application processor 2004, and the SoC 2005. The memory 2006 may include a built-in memory device that is integrated within the baseband processor 2003, the application processor 2004, or the SoC 2005. The memory 2006 may include a memory in a Universal Integrated Circuit Card (UICC).

The memory 2006 may store a software module(s) (computer program(s)) including instructions and data necessary for performing the processing of the non-legacy UE 2 described in the above embodiments. In some implementations, the baseband processor 2003 or the application processor 2004 may be configured to load this software module(s) from the memory 2006 and execute it and thereby perform the processing of the non-legacy UE 2 described in the above embodiments.

Figure 21:
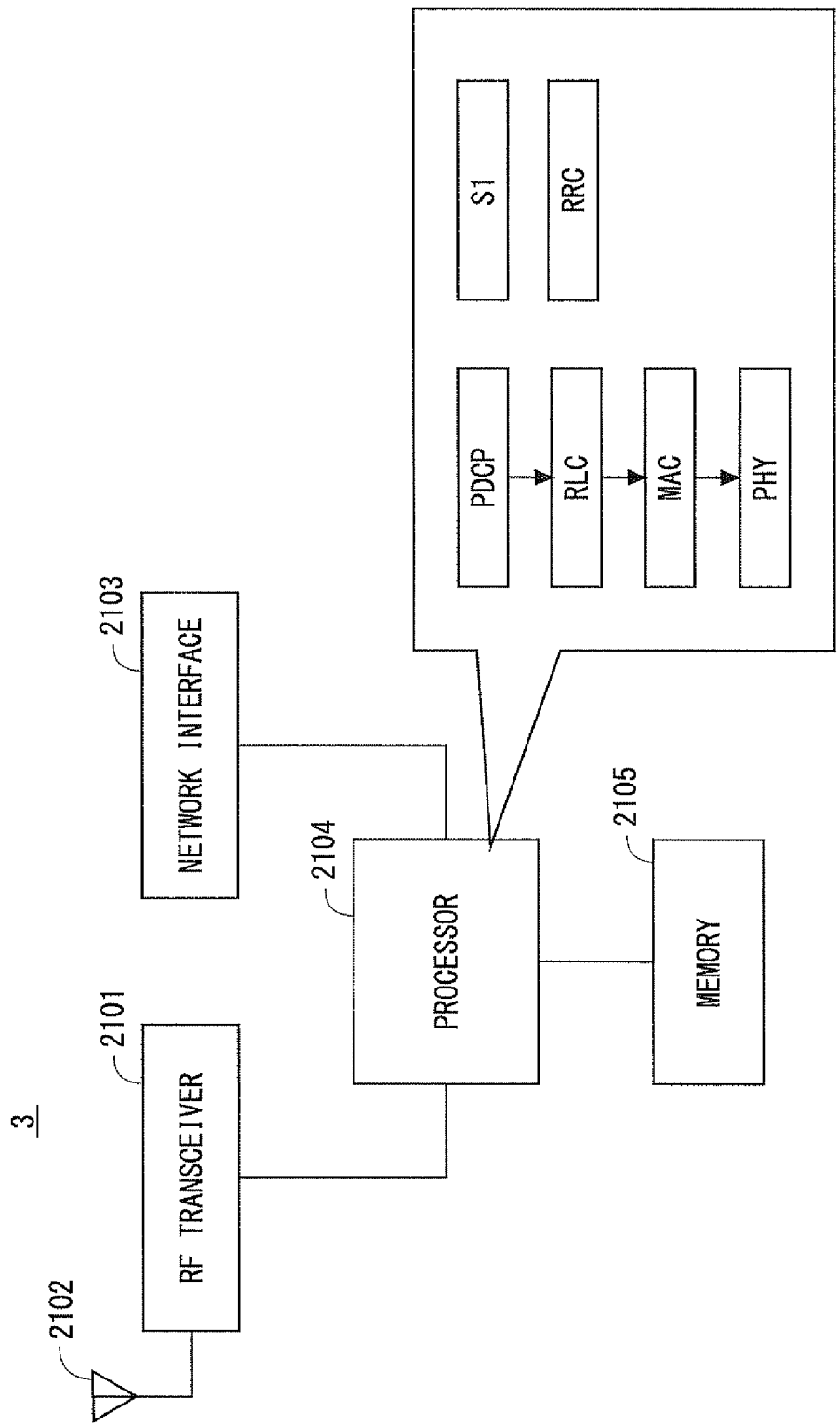
FIG. 21 is a block diagram showing a configuration example of a radio base station according to some embodiments.

FIG. 21 is a block diagram showing a configuration example of the BS 3 according to the above embodiments. Referring to FIG. 21, the BS 3 includes an RF transceiver 2101, a network interface 2103, a processor 2104, and a memory 2105. The RF transceiver 2101 performs analog RF signal processing to communicate with the legacy UE 1 and the non-legacy UE 2. The RF transceiver 2101 may include a plurality of transceivers. The RF transceiver 2101 is coupled to an antenna 2102 and a processor 2104. The RF transceiver 2101 receives modulated symbol data (or OFDM symbol data) from the processor 2104, generates a transmission RF signal, and supplies the transmission RF signal to the antenna 2102. Further, the RF transceiver 2101 generates a baseband reception signal based on a reception RF signal received by the antenna 2102, and supplies the baseband reception signal to the processor 2104.

The network interface 2103 is used to communicate with network nodes (e.g., MME and S/P-GW). The network interface 2103 may include, for example, a network interface card (NIC) conforming to the IEEE 802.3 series.

The processor 2104 performs digital baseband signal processing (i.e., data plane processing) and control plane processing for radio communication. For example, in the case of LTE and LTE-Advanced, the digital baseband signal processing performed by the processor 2104 may include signal processing of the PDCP layer, the RLC layer, the MAC layer, and the PHY layer. The control plane processing performed by the processor 2104 may include processing of the Si protocol and the RRC protocol.

The processor 2104 may include a plurality of processors. For example, the processor 2104 may include a modem processor (e.g., DSP) that performs the digital baseband signal processing and a protocol stack processor (e.g., CPU or MPU) that performs the control plane processing.

The memory 2105 is composed of a combination of a volatile memory and a non-volatile memory. The volatile memory is, for example, an SRAM, a DRAM, or a combination thereof. The non-volatile memory is, for example, an MROM, a PROM, a flash memory, a hard disk drive, or any combination thereof. The memory 2105 may include a storage that is disposed separately from the processor 2104. In this case, the processor 2104 may access the memory 2105 via the network interface 2103 or an I/O interface (not shown).

The memory 2105 may store a software module(s) (computer program(s)) including instructions and data necessary for performing the processing of the BS 3 described in the above embodiments. In some implementations, the processor 2104 may be configured to load this software module(s) from the memory 2105 and execute it and thereby perform the processing of the BS 3 described in the above embodiments.

As described above with reference to FIGS. 20 and 21, each of the processors included in the non-legacy UE 2 and the BS 3 according to the above-described embodiments executes one or more programs including instructions for causing a computer to perform an algorithm described with reference to the drawings. This program(s) can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, semiconductor memories (such as Mask ROM, Programmable ROM (PROM), Erasable PROM (EPROM), flash ROM, Random Access Memory (RAM)). This program(s) may be provided to a computer using any type of transitory computer readable media. Examples of transitory computer readable media include electric signals, optical signals, and electromagnetic waves. Transitory computer readable media can provide the program(s) to a computer via a wired communication line (e.g. electric wires, and Optical Fibers) or a Wireless Communication Line.

Other Embodiments

The above embodiments may be implemented individually or in any combination.

Further, the above-described embodiments are merely examples of applications of the technical ideas obtained by the inventor. These technical ideas are not limited only to the above-described embodiments, and various modifications may be made as a matter of course.

This application is based upon and claims the benefit of priority from Japanese Patent Application No. 2015-045124, filed on Mar. 6, 2015, the entire disclosure of which is incorporated herein by reference.

REFERENCE SIGNS LIST

1 LEGACY UE
2 NON-LEGACY UE
3 RADIO BASE STATION
31 CELL
2001 RF TRANSCEIVER
2003 BASEBAND PROCESSOR
2101 RF TRANSCEIVER
2104 PROCESSOR

The invention claimed is:

1. A radio station comprising:
at least one radio transceiver; and
at least one processor coupled to the at least one radio transceiver,
wherein the at least one processor is configured to allocate a first plurality of time-frequency resources and a second plurality of time-frequency resources to at least one radio terminal,
the first plurality of time-frequency resources are used to transmit or receive a first transport block in accordance with a first transmission time interval (TTI),
the first TTI is equal to a duration of one subframe,
a duration of the first plurality of time-frequency resources corresponds to the duration of one subframe,
the second plurality of time-frequency resources are used to transmit or receive a second transport block in accordance with a second TTI,
the second TTI is shorter than the duration of one subframe, and
a duration of the second plurality of time-frequency resources is shorter than the duration of one subframe,
wherein the at least one processor is configured to allocate, to the at least one radio terminal, a third plurality of time-frequency resources used to transmit uplink control information containing an allocation request for the first plurality of time-frequency resources,
wherein the at least one processor is configured to allocate, to the at least one radio terminal, a fourth plurality of time-frequency resources used to transmit uplink control information containing an allocation request for the second plurality of time-frequency resources,
wherein a duration of the third plurality of time-frequency resources corresponds to the duration of one subframe, and
wherein a duration of the fourth plurality of time-frequency resources is shorter than the duration of one subframe.

2. The radio station according to claim 1, wherein
the whole of the first transport block is used to calculate first error detection bits, and the first error detection bits are added to the first transport block,
the first plurality of time-frequency resources are used to transmit the first transport block and the first error detection bits added thereto,
the whole of the second transport block is used to calculate second error detection bits, and the second error detection bits are added to the second transport block, and
the second plurality of time-frequency resources are used to transmit the second transport block and the second error detection bits added thereto.

3. The radio station according to claim 1, wherein the at least one processor is configured to allocate the first and second plurality of time-frequency resources to different radio terminals.

4. The radio station according to claim 1, wherein the at least one processor is configured to allocate the first and second plurality of time-frequency resources to the same radio terminal.

5. The radio station according to claim 1, wherein
one subframe is composed of a plurality of time slots,
each of the plurality of time slots includes a plurality of time-frequency resources,
the second TTI is equal to a duration of at least one of the plurality of time slots, and
the duration of the second plurality of time-frequency resources corresponds to the second TTI.

6. The radio station according to claim 1, wherein
the second TTI is equal to or shorter than half the duration of one subframe, and
the duration of the second plurality of time-frequency resources corresponds to the second TTI.

7. The radio station according to claim 6, wherein the second TTI is an integer multiple of a symbol length.

8. The radio station according to claim 1, wherein each of the first transport block and the second transport block is a transport block of an Uplink Shared channel (UL-SCH) or a Downlink Shared channel (DL-SCH) used to transmit a user data packet.

9. The radio station according to claim 1, wherein
the duration of the first plurality of time-frequency resources corresponds to a duration of a pair of temporally consecutive resource blocks,
the second TTI is equal to or shorter than a duration of one resource block, and
the duration of the second plurality of time-frequency resources corresponds to the second TTI.

10. The radio station according to claim 1, wherein
the first TTI is a minimum unit of a transmission time allocated by one scheduling grant to a radio terminal using the first TTI, and
the second TTI is a minimum unit of a transmission time allocated by one scheduling grant to a radio terminal using the second TTI.

11. The radio station according to claim 1, wherein the uplink control information includes a scheduling request.

12. The radio station according to claim 1, wherein the duration of the fourth plurality of time-frequency resources is equal to or shorter than half the duration of one subframe.

13. The radio station according to claim 1, wherein
the duration of the third plurality of time-frequency resources corresponds to a duration of a pair of temporally consecutive resource blocks, and
the duration of the fourth plurality of time-frequency resources is equal to or shorter than a duration of one resource block.

14. The radio station according to claim 1, wherein the at least one processor is configured to allocate, based on control information transmitted from the at least one radio terminal or a core network node, the second plurality of time-frequency resources for transmission in accordance with the second TTI.

15. A radio terminal comprising:
at least one radio transceiver; and
at least one processor configured to selectively perform a first access operation and a second access operation by using the at least one radio transceiver, wherein
the first access operation includes transmitting or receiving a first transport block in accordance with a first transmission time interval (TTI),
the first TTI is equal to a duration of one subframe,
the first transport block is transmitted using a first plurality of time-frequency resources in one subframe,
a duration of the first plurality of time-frequency resources corresponds to the duration of one subframe,
the second access operation includes transmitting or receiving a second transport block in accordance with a second TTI,
the second TTI is shorter than the duration of one subframe,
the second transport block is transmitted using a second plurality of time-frequency resources in one subframe, and
a duration of the second plurality of time-frequency resources is shorter than the duration of one subframe,
wherein the first access operation further includes transmitting uplink control information using a third plurality of time-frequency resources, the uplink control information containing an allocation request for the first plurality of time-frequency resources,
wherein the second access operation further includes transmitting uplink control information using a fourth plurality of time-frequency resources, the uplink control information containing an allocation request for the second plurality of time-frequency resources,
wherein a duration of the third plurality of time-frequency resources corresponds to the duration of one subframe, and
wherein a duration of the fourth plurality of time-frequency resources is shorter than the duration of one subframe.

16. The radio terminal according to claim 15, wherein
the whole of the first transport block is used to calculate first error detection bits, and the first error detection bits are added to the first transport block,
the first plurality of time-frequency resources are used to transmit the first transport block and the first error detection bits added thereto,
the whole of the second transport block is used to calculate second error detection bits, and the second error detection bits are added to the second transport block, and
the second plurality of time-frequency resources are used to transmit the second transport block and the second error detection bits added thereto.

17. The radio terminal according to claim 15, wherein
one subframe is composed of a plurality of time slots,
each of the plurality of time slots includes a plurality of time-frequency resources,
the second TTI is equal to a duration of at least one of the plurality of time slots, and
the duration of the second plurality of time-frequency resources corresponds to the second TTI.

18. The radio terminal according to claim 15, wherein
the second TTI is equal to or shorter than half the duration of one subframe, and
the duration of the second plurality of time-frequency resources corresponds to the second TTI.

19. A method performed by a radio station, the method comprising:
allocating a first plurality of time-frequency resources and a second plurality of time-frequency resources to at least one radio terminal, wherein
the first plurality of time-frequency resources are used to transmit or receive a first transport block in accordance with a first transmission time interval (TTI),
the first TTI is equal to a duration of one subframe,
a duration of the first plurality of time-frequency resources corresponds to the duration of one subframe,
the second plurality of time-frequency resources are used to transmit or receive a second transport block in accordance with a second TTI,
the second TTI is shorter than the duration of one subframe, and
a duration of the second plurality of time-frequency resources is shorter than the duration of one subframe,
wherein the method further comprises:
allocating, to the at least one radio terminal, a third plurality of time-frequency resources used to transmit uplink control information containing an allocation request for the first plurality of time-frequency resources; and
allocating, to the at least one radio terminal, a fourth plurality of time-frequency resources used to transmit uplink control information containing an allocation request for the second plurality of time-frequency resources,
wherein a duration of the third plurality of time-frequency resources corresponds to the duration of one subframe, and
wherein a duration of the fourth plurality of time-frequency resources is shorter than the duration of one subframe.

* * * * *

UNITED STATES PATENT AND TRADEMARK OFFICE
CERTIFICATE OF CORRECTION

PATENT NO. : 10,342,016 B2
APPLICATION NO. : 15/552642
DATED : July 2, 2019
INVENTOR(S) : Hisashi Futaki It is certified that error appears in the above-identified patent and that said Letters Patent is hereby corrected as shown below:

In the Specification

Column 28, Description of Embodiments, Line 13; Delete "Si" and insert --S1-- therefor Signed and Sealed this
Twenty-ninth Day of October, 2019

Andrei Iancu
*Director of the United States Patent and Trademark Office*